US012634901B2

(12) United States Patent
Echigo et al.

(10) Patent No.: US 12,634,901 B2
(45) Date of Patent: May 19, 2026

(54) TERMINAL AND RADIO COMMUNICATION METHOD FOR TRANSMISSION OF A TRANSPORT BLOCK OVER MULTI-SLOT

(71) Applicant: NTT DOCOMO, INC., Tokyo (JP)

(72) Inventors: Haruhi Echigo, Tokyo (JP); Hiroki Harada, Tokyo (JP); Daisuke Kurita, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/283,674

(22) PCT Filed: Mar. 24, 2021

(86) PCT No.: PCT/JP2021/012420
§ 371 (c)(1),
(2) Date: Sep. 22, 2023

(87) PCT Pub. No.: WO2022/201403
PCT Pub. Date: Sep. 29, 2022

(65) Prior Publication Data
US 2024/0179688 A1 May 30, 2024

(51) Int. Cl.
*H04W 72/0446* (2023.01)
(52) U.S. Cl.
CPC .............................. *H04W 72/0446* (2013.01)
(58) Field of Classification Search
CPC ......... H04W 72/0446; H04W 72/1268; H04W 72/23; H04W 72/04
See application file for complete search history.

(56) References Cited

U.S. PATENT DOCUMENTS

| | | | | |
|---|---|---|---|---|
| 11,533,714 | B2 * | 12/2022 | Takeda .................. | H04W 28/18 |
| 2019/0053211 | A1 * | 2/2019 | Ying .................. | H04W 72/044 |
| 2021/0007087 | A1 * | 1/2021 | Wei .......................... | H04L 1/18 |
| 2021/0037519 | A1 * | 2/2021 | Matsumura ......... | H04J 13/0074 |
| 2021/0067950 | A1 * | 3/2021 | Hosseini ............... | H04W 16/14 |
| 2022/0046623 | A1 * | 2/2022 | Xiong ................... | H04L 1/1819 |
| 2022/0322409 | A1 * | 10/2022 | Yokomakura ......... | H04L 5/0048 |
| 2024/0032024 | A1 * | 1/2024 | Dai .......................... | H04L 1/08 |
| 2024/0089953 | A1 * | 3/2024 | Takahashi ......... | H04W 72/1268 |

OTHER PUBLICATIONS

International Search Report issued in PCT/JP2021/012420 on Nov. 2, 2021 (7 pages).
Written Opinion of the International Searching Authority issued in PCT/JP2021/012420 on Nov. 2, 2021 (7 pages).
Wilus Inc.; "Discussion on TB processing over multi-slot Pusch"; 3GPP TSG RAN WG1 #104-e, R1-2101680; e-Meeting; Jan. 25-Feb. 5, 2021 (3 pages).

(Continued)

*Primary Examiner* — Ivan O Latorre
(74) *Attorney, Agent, or Firm* — Osha Bergman Watanabe & Burton LLP

(57) ABSTRACT

A terminal receives control information indicating allocation of a physical uplink shared channel in a time domain and allocates the physical uplink shared channel across multiple slots. Based on the control information, the terminal determines a transport block to be transmitted over the physical uplink shared channel.

4 Claims, 16 Drawing Sheets

(56)             References Cited

OTHER PUBLICATIONS

China Telecom; "New WID on NR coverage enhancements"; 3GPP TSG RAN meeting #90-e, RP-202928; Electronic Meeting; Dec. 7-11, 2020 (5 pages).

MCC Support; "Final Report of 3GPP TSG RAN WG1 #104bis-e v1.0.0 (Online meeting, Apr. 12-20, 2021)"; 3GPP TSG RAN WG1 Meeting #105-e, R1-2104151; e-Meeting; May 10-27, 2021 (141 pages).

Office Action issued in Japanese Patent Application No. 2023-508295, mailed on Jan. 7, 2025 (11 pages).

Moderator (Nokia, Nokia Shanghai Bell); "FL summary of TB processing over multi-slot Pusch (AI 8.8.1.2)"; 3GPP TSG RAN WG1 #104-e, R1-2102241; e-Meeting; Jan. 25-Feb. 5, 2021 (78 pages).

Office Action issued in Japanese Patent Application No. 2023-508295, dated Jun. 10, 2025 (7 pages).

* cited by examiner

Figure 3:
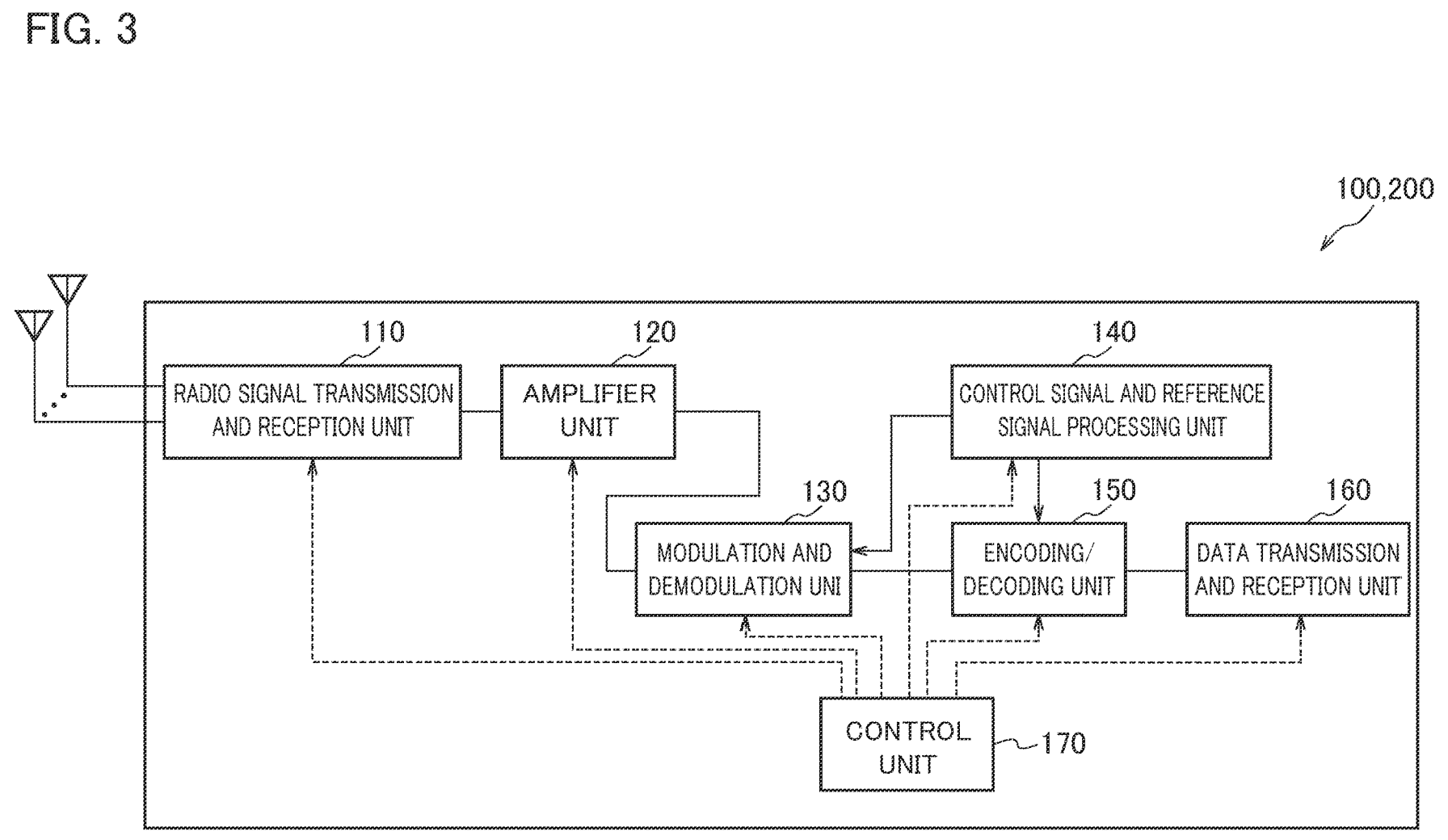

110 RADIO SIGNAL TRANSMISSION AND RECEPTION UNIT

120 AMPLIFIER UNIT

130 MODULATION AND DEMODULATION UNIT

140 CONTROL SIGNAL AND REFERENCE SIGNAL PROCESSING UNIT

150 ENCODING/ DECODING UNIT

160 DATA TRANSMISSION AND RECEPTION UNIT

170 CONTROL UNIT

OptA

OptB

Example of Alt2

If maxCodeBlockGroupsPerTransportBlock = 4, divide 1TB over 3 slots to 4CB 1 slot 1TB over 3slots

FIG. 12

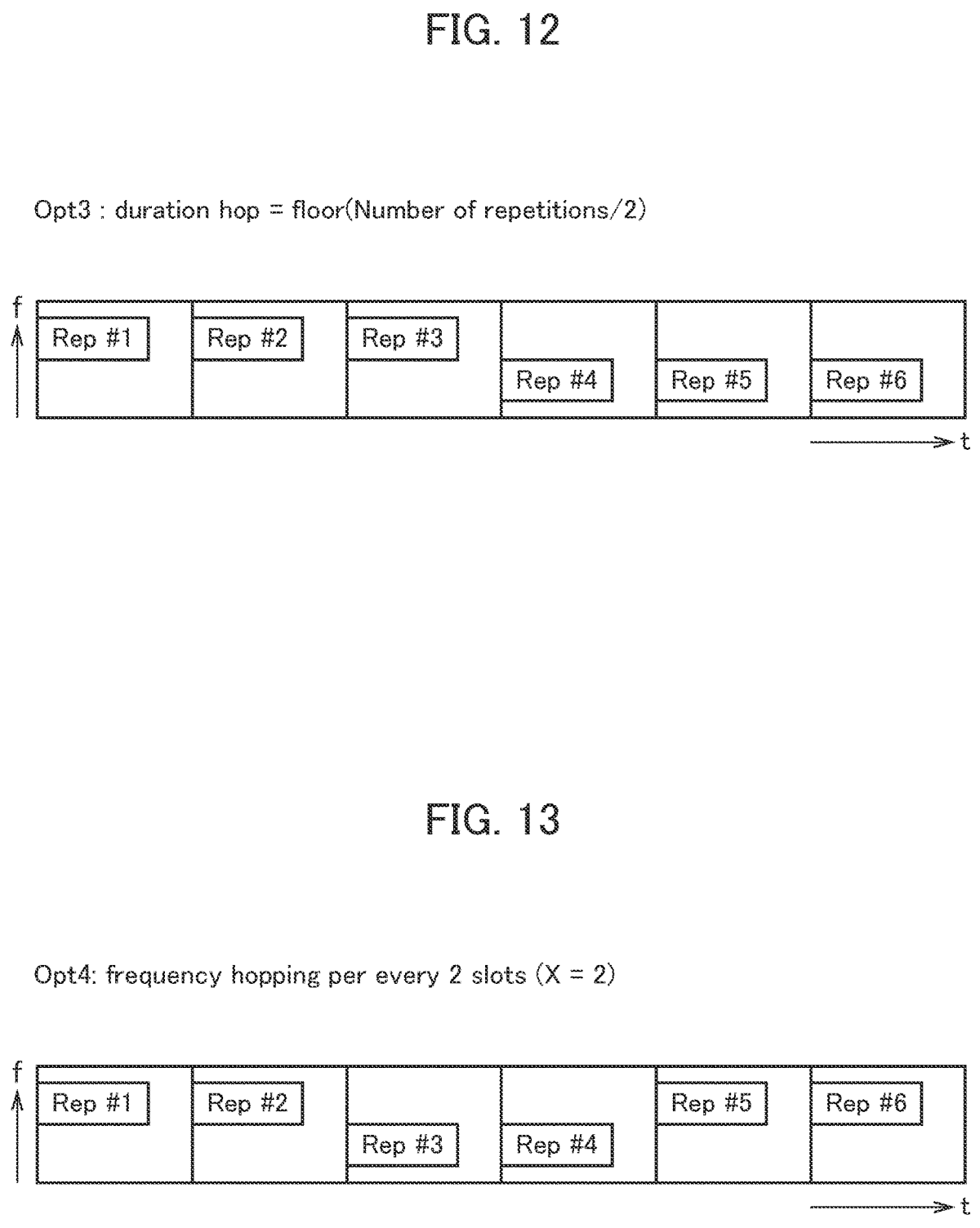

Opt3 : duration hop = floor(Number of repetitions/2)

f

| Rep #1 | Rep #2 | Rep #3 | | | |
| | | | Rep #4 | Rep #5 | Rep #6 |

Opt4: frequency hopping per every 2 slots (X = 2)

f

| Rep #1 | Rep #2 | | | Rep #5 | Rep #6 |
| | | Rep #3 | Rep #4 | | |

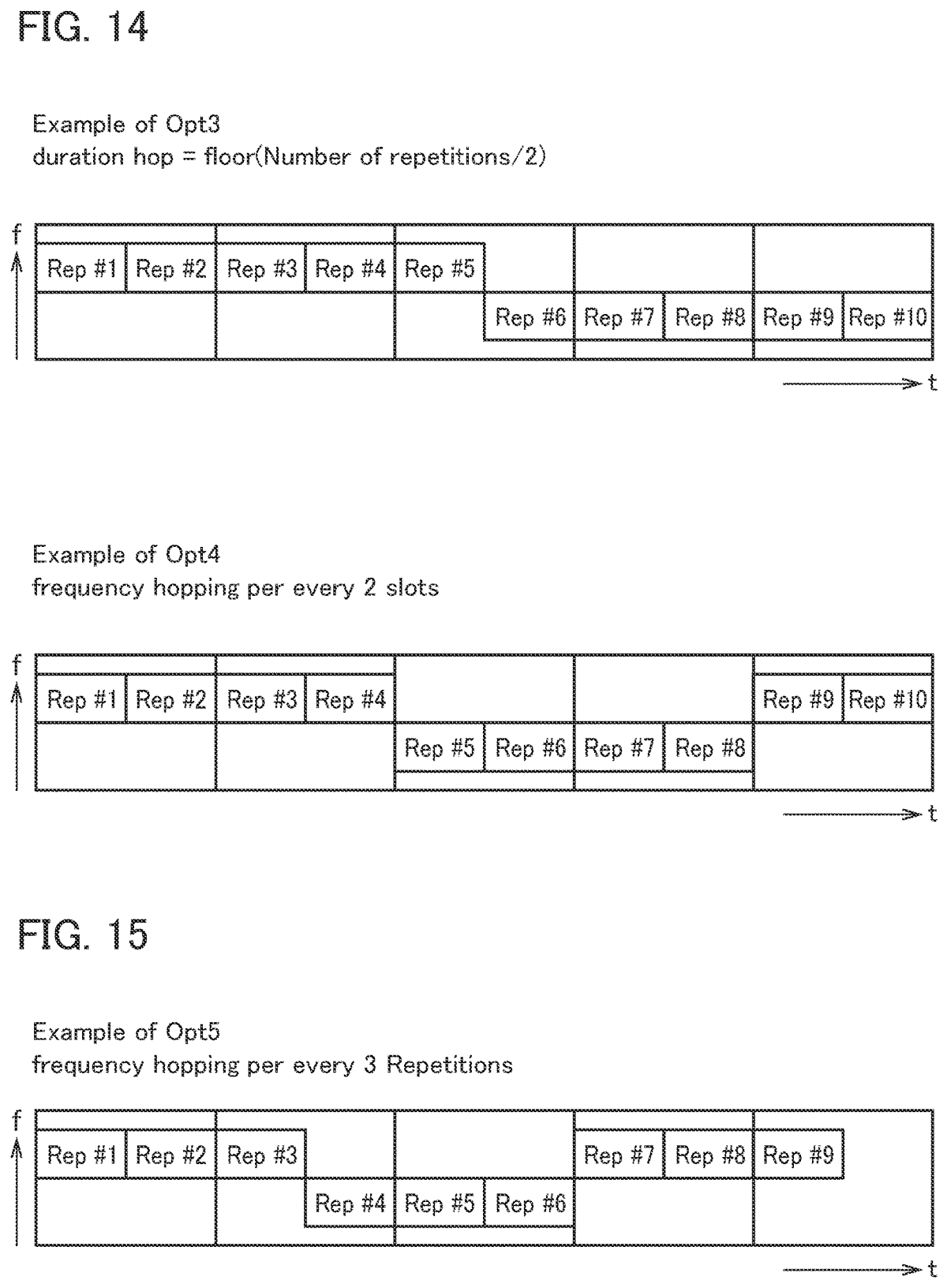

Example of Opt3
duration hop = floor(Number of repetitions/2)

Example of Opt4
frequency hopping per every 2 slots

FIG. 15

Example of Opt5
frequency hopping per every 3 Repetitions

FIG. 16

| | |
|---|---|
| R | Timing Advance Command | Oct 1 |
| Timing Advance Command | UL Grant | Oct 2 |
| UL Grant | | Oct 3 |
| UL Grant | | Oct 4 |
| UL Grant | | Oct 5 |
| Temporary C-RNTI | | Oct 6 |
| Temporary C-RNTI | | Oct 7 |

100, 200

1001 PROCESSOR

1007

1004 COMMUNICATION DEVICE

1002 MEMORY

1005 INPUT DEVICE

1003 STORAGE

1006 OUTPUT DEVICE

TERMINAL AND RADIO COMMUNICATION METHOD FOR TRANSMISSION OF A TRANSPORT BLOCK OVER MULTI-SLOT

TECHNICAL FIELD

This disclosure relates to a terminal and a radio communication method that support coverage enhancement.

BACKGROUND ART

3rd Generation Partnership Project (3GPP) specifies 5th generation mobile communication system (5G, also called New Radio (NR) or Next Generation (NG), further, a succeeding system called Beyond 5G, 5G Evolution or 6G is being specified.

For example, in 3GPP Release-17, it is agreed to consider coverage enhancement (CE) in NR (Non-Patent Literature 1).

In terms of coverage enhancement, it was also agreed to examine how to determine the time resources of physical uplink shared channels allocated to multiple slots, specifically, TB processing over multi-slot PUSCH (TBOMS), which processes transport blocks (TBs) via PUSCH (Physical Uplink Shared Channel) (Non-Patent Literature 2).

CITATION LIST

Non-Patent Literature

Non-Patent Literature 1 "New WID on NR coverage enhancements," RP-202928, 3GPP TSG RAN meeting #90e, 3GPP, December 2020
Non-Patent Literature 2 "RAN1 Chairperson's Notes," 3GPP TSG RAN WG1 meeting #104 e e-Meeting, 3GPP, February 2021

SUMMARY OF INVENTION

However, in 3GPP Release-15, 16, the transport block size (TBS) is specified on the basis of a single slot, and applying the TBS as is to a TBOMS may not necessarily be efficient.

Therefore, the following disclosure has been made in view of this situation, and aims to provide a terminal and a radio communication method that can more efficiently realize a TBoMS that processes transport blocks (TBs) via a physical uplink shared channel (PUSCH) allocated to multiple slots.

One aspect of the disclosure is a terminal (UE200) including a reception unit (control signal and reference signal processing unit 240) that receives control information indicating allocation in a time domain of a physical uplink shared channel and a control unit (control unit 270) that allocates the physical uplink shared channel across multiple slots. The control unit determines a transport block to be transmitted over the physical uplink shared channel based on the control information.

One aspect of the disclosure is a terminal (UE200) including a control unit (control unit 270) that allocates a physical uplink shared channel across multiple slots and a transmission unit (radio signal transmission and reception unit 210) that transmits data sequences over the physical uplink shared channel. The transmission unit repeatedly transmits the data sequences after the multiple code blocks are concatenated over the physical uplink shared channel.

One aspect of the disclosure is a terminal (UE200) including a control unit (control unit 270) that allocates a physical uplink shared channel across multiple slots and a transmission unit (radio signal transmission and reception unit 210) that transmits the physical uplink shared channel. The control unit determines a size of transport block transmitted over the physical uplink shared channel based on configuration information of the physical uplink shared channel in a serving cell.

One aspect of the disclosure is a terminal (UE200) including a control unit (control unit 270) that allocates a physical uplink shared channel across multiple slots and a transmission unit (radio signal transmission and reception unit 210) that transmits the physical uplink shared channel. The control unit, based on whether or not to allocate the physical uplink shared channel across multiple slots, determines division of a transport block transmitted over the physical uplink shared channel into multiple code blocks.

One aspect of the disclosure is a terminal (UE200) including a control unit (control unit 270) that allocates a physical uplink shared channel across multiple slots and a transmission unit (radio signal transmission and reception unit 210) that transmits the physical uplink shared channel. The control unit determines a modulation and coding scheme applied to the physical uplink shared channel based on whether or not to allocate the physical uplink shared channel across multiple slots.

One aspect of the disclosure is a radio communication method comprising the steps of receiving control information indicating allocation in a time domain of a physical uplink shared channel and a step of allocating the physical uplink shared channel across multiple slots. In the allocating step, a transport block to be transmitted over the physical uplink shared channel is determined based on the control information.

BRIEF DESCRIPTION OF DRAWINGS

FIG. 3 is a functional block diagram of gNB100 and UE200.

FIG. 12 is a diagram showing an example of UL channel Repetition in operation example 6 (Opt 3).

FIG. 13 is a diagram showing an example of UL channel Repetition in operation example 6-1 (Opt 4).

FIG. 14 is a diagram showing an example of UL channel Repetition in operation example 6-2 (Opt 3, 4).

FIG. 15 is a diagram showing an example of UL channel Repetition in operation example 6-2 (Opt 5).

Figure 16:
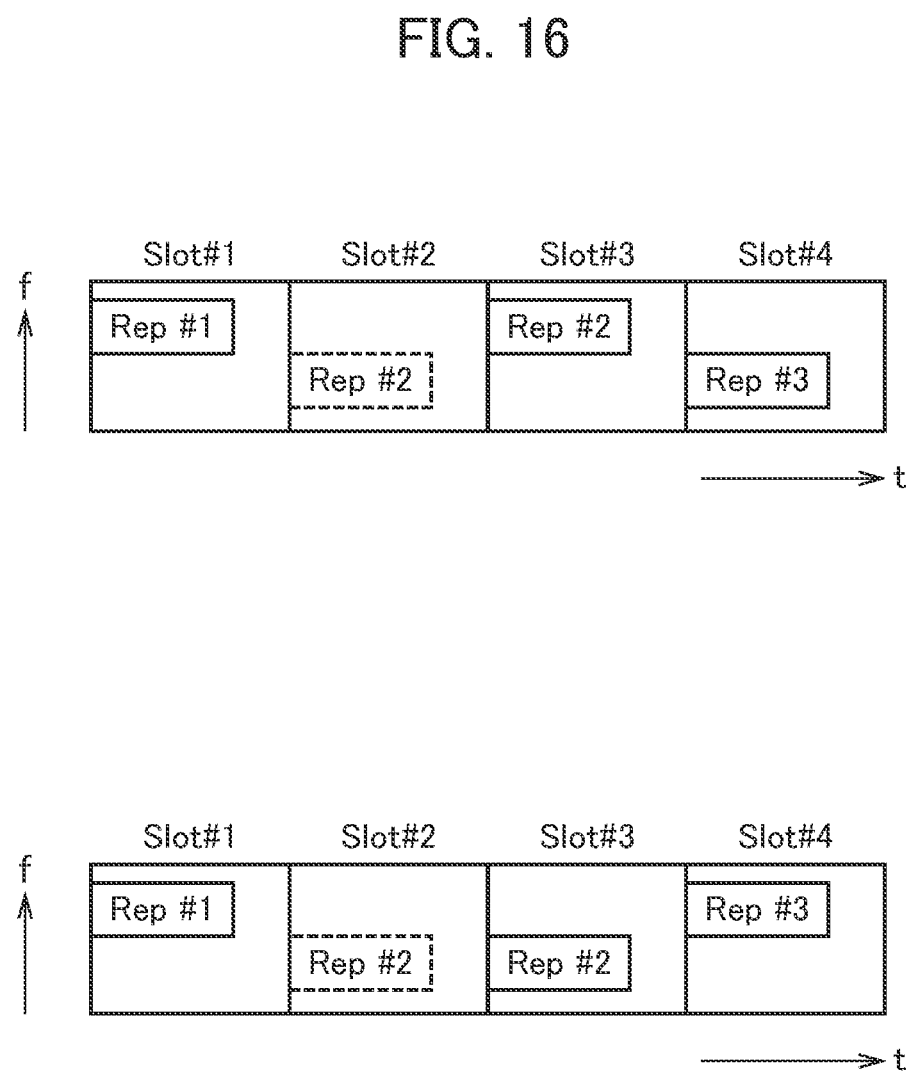

FIG. 16 is a diagram showing an example of UL channel Repetition in operation example 6-3 (Alt 1, 2).

Figure 17:
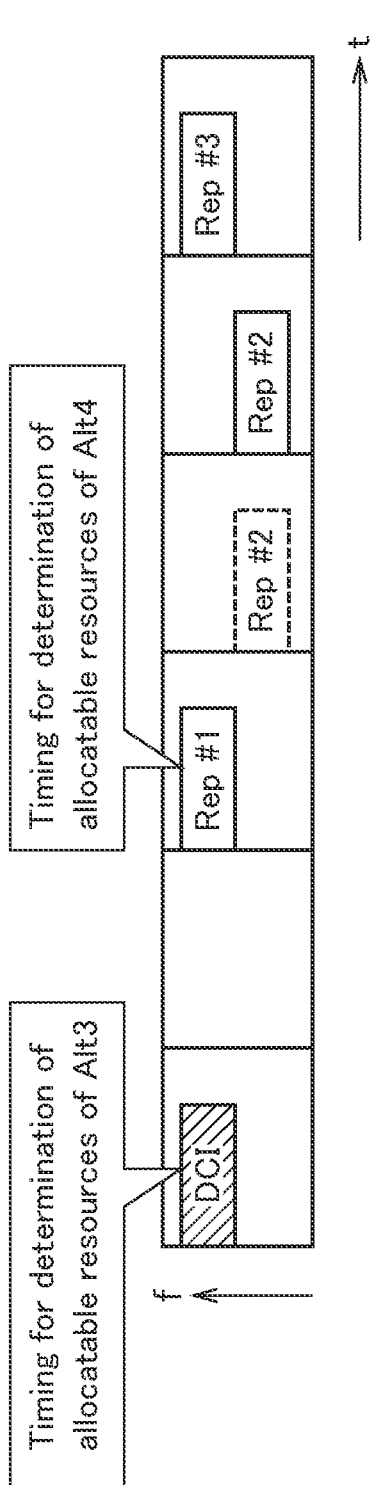

FIG. 17 is a diagram showing an example of UL channel Repetition in operation example 6-3 (Alt 3, 4).

Figures 18, 19:
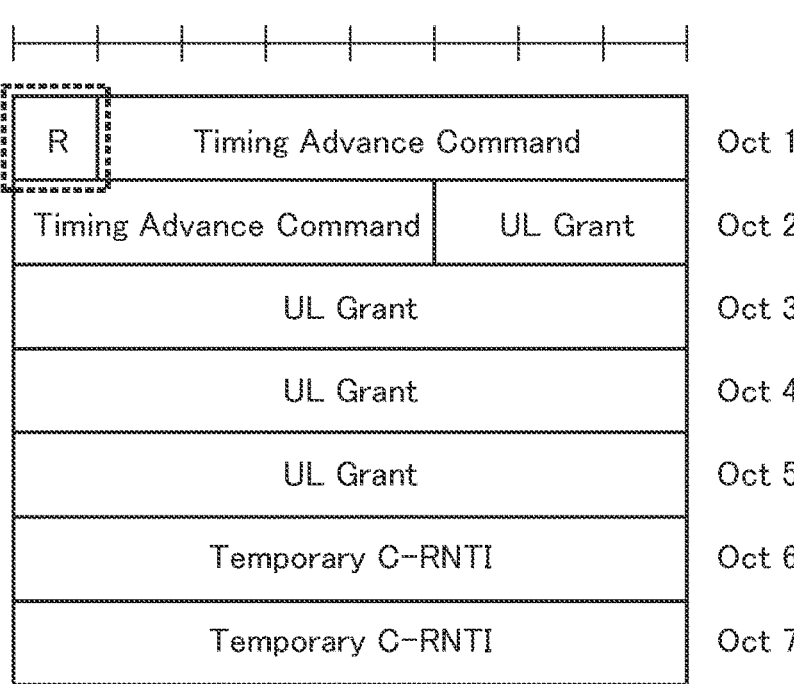

FIG. 18 is a diagram showing an example configuration of the MAC RAR according to operation example 7.

FIG. 19 shows an example of the hardware configuration of the gNB100 and UE200.

MODES FOR CARRYING OUT THE INVENTION

Exemplary embodiments of the present invention are explained below with reference to the accompanying drawings. Note that, the same or similar reference numerals have been attached to the same functions and configurations, and the description thereof is appropriately omitted.

(1) Overall Schematic Configuration of the Radio Communication System

Figure 1:
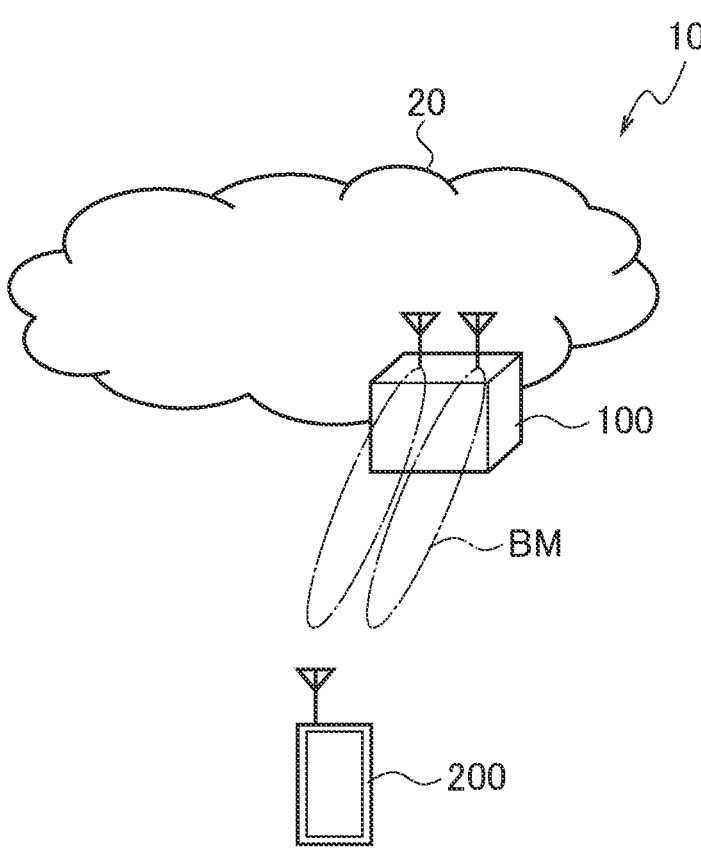
FIG. 1 is an overall schematic diagram of radio communication system 10.

FIG. 1 is an overall schematic diagram of a radio communication system 10 according to the present embodiment. The radio communication system 10 is a radio communication system according to 5G New Radio (NR) and includes a Next Generation-Radio Access Network 20 (NG-RAN 20, and a terminal 200 (User Equipment 200, below, UE200). The radio communication system 10 may be a radio communication system according to a scheme called Beyond 5G, 5G Evolution or 6G.

The NG-RAN20 includes a radio base station 100 (Below, gNB100). The specific configuration of radio communication system 10 including the number of gNBs and UEs is not limited to the example shown in FIG. 1.

The NG-RAN20 actually includes multiple NG-RAN nodes, specifically, gNBs (or ng-eNBs), and is connected to a core network (5GC, not shown) according to 5G. Note that NG-RAN20 and 5GC may simply be described as "network."

The gNB100 is a radio base station according to NR and performs radio communication according to UE200 and NR. By controlling radio signals transmitted from multiple antenna elements, the gNB100 and UE200 can support Massive MIMO that generates more directional beams, carrier aggregation (CA) that uses multiple component carriers (CCs) bundled together, and dual connectivity (DC) that simultaneously communicates between the UE and each of the multiple NG-RAN nodes.

radio communication system 10 corresponds to FR1 and FR2. The frequency bands of each FR (Frequency Range) are as follows:

FR1: 410 MHz to 7.125 GHZ

FR2: 24.25 GHz to 52.6 GHz

FR1 may use sub-carrier spacing (SCS) of 15, 30 or 60 kHz and a bandwidth (BW) of 5~100 MHz. FR2 is a higher frequency than FR1, an SCS of 60 or 120 kHz (240 kHz may be included) may be used and a bandwidth (BW) of 50-400 MHZ may be used.

In addition, the radio communication system 10 may support a higher frequency band than that of FR2. Specifically, the radio communication system 10 may support frequency bands above 52.6 GHz and up to 114.25 GHz.

It may also apply Cyclic Prefix-Orthologous Frequency Division Multiplexing (CP-OFDM)/Discrete Fourier Transform-Spread (DFT-S-OFDM) with larger Sub-Carrier Spacing (SCS). Furthermore, DFT-S-OFDM may be applied not only to the uplink (UL) but also to the downlink (DL).

Figure 2:
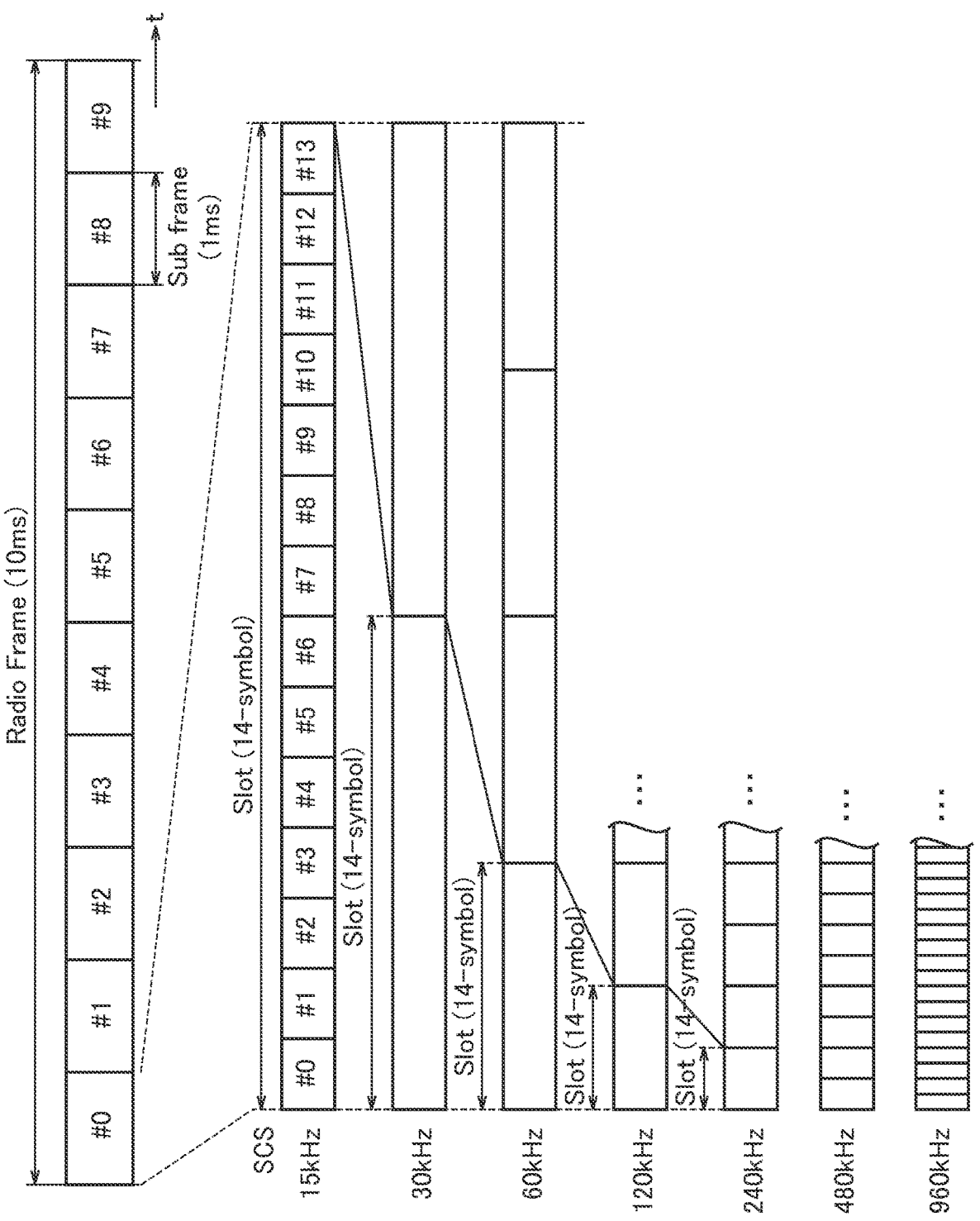
FIG. 2 is a diagram showing an example configuration of the radio frame, subframe and slot used in radio communication system 10.

FIG. 2 shows an example configuration of the radio frame, subframe and slot used in the radio communication system 10.

As shown in FIG. 2, one slot consists of 14 symbols, and the larger (wider) the SCS, the shorter the symbol period (and slot period). The number of symbols constituting one slot need not necessarily be 14 symbols (For example, 28, 56 symbols). In addition, the number of slots per subframe may vary depending on the SCS. In addition, the SCS may be wider than 240 kHz (For example, as shown in FIG. 2, 480 kHz, 960 kHz).

Note that the time direction (t) shown in FIG. 2 may be referred to as a time region, a time domain, a symbol period or a symbol time. The frequency direction may also be referred to as a frequency region, a frequency domain, a resource block, a resource block group, a subcarrier, a BWP (band width part), a subchannel, a common frequency resource, etc.

The radio communication system 10 can support Coverage Enhancement (CE) to extend the coverage of the cells (or even physical channels) formed by the gNB100. Coverage extensions may provide mechanisms to increase the reception success rate of various physical channels.

For example, the gNB100 can support repeated PDSCH (Physical Downlink Shared Channel) transmissions, and the UE200 can support repeated PUSCH (Physical Uplink Shared Channel) transmissions.

On the radio communication system 10, a Slot Configuration pattern for time division duplex (TDD) may be set. For example, DDDSU (D: Downlink (DL) symbol, S: DL/Uplink (UL) or Guard symbol, U: UL symbol) may be specified (see 3GPP TS38.101-4).

"D" indicates a slot containing all DL symbols, and "S" indicates a slot containing a mixture of DL, UL, and guard symbols (G). "U" indicates a slot containing all UL symbols. For example, if the S-slot is 10D+2G+2U, two consecutive symbols (2U) and one slot (14 symbols) in the time direction can be utilized for UL, i.e., multiple consecutive slots can be utilized for UL.

Also, the radio communication system 10 can perform channel estimation of PUSCH (or PUCCH (Physical Uplink Control Channel)) using the demodulation reference signal (DMRS) for each slot, but it can also perform channel estimation of PUSCH (or PUCCH) using DMRS assigned to each of multiple slots. Such channel estimation may be called joint channel estimation. Alternatively, it may be called a different name, such as cross-slot channel estimation.

The UE200 can transmit a multi-slot allocated (straddled) DMRS so that the gNB100 can perform joint channel estimation using the DMRS.

Also, in the radio communication system 10, for coverage enhancement, TB processing over multi-slot PUSCH (TBOMS) which processes transport blocks (TBs) via multi-slot allocated PUSCH may be applied.

In TBoMS, the number of symbols allocated may be the same in each slot, as in Time Domain Resource Allocation (TDRA) of PUSCH's Repetition type A (more on that later), or the number of symbols allocated to each slot may be different, as in TDRA of PUSCH's Repetition type B (more on that later).

TDRA may be interpreted as resource allocation in the time domain of PUSCH as specified in 3GPP TS38.214. TDRA of PUSCH may be interpreted as specified by the Information Element (IE) of the Radio Resource Control Layer (RRC), specifically PDSCH-Config or PDSCH-ConfigCommon.

TDRA may also be interpreted as resource allocation in the time domain of PUSCH specified by Downlink Control Information (DCI).

(2) Function Block Configuration of Radio Communication System

Next, the functional block configuration of the radio communication system 10 will be described. Specifically, the functional block configuration of the UE200 will be described. FIG. 3 is a functional block configuration diagram of gNB100 and UE200.

As shown in FIG. 3, the UE200 comprises a radio signal transmission and reception unit 210, an amplifier unit 220, a modulation and demodulation unit 230, a control signal and reference signal processing unit 240, an encoding/decoding unit 250, a data transmission and reception unit 260 and a control unit 270.

Note that only the main functional blocks related to the description of the embodiment are shown in FIG. 3, and the UE200 (gNB100) has other functional blocks (For example, the power supply). Also, FIG. 3 shows the functional block configuration of the UE200, and see FIG. 19 for the hardware configuration.

The radio signal transmission and reception unit 210 transmits and receives radio signals in accordance with NR. By controlling radio (RF) signals transmitted from multiple antenna elements, the radio signal transmission and reception unit 210 can support Massive MIMO for generating more directional beams, Carrier Aggregation (CA) for bundling multiple component carriers (CCs), and Dual Connectivity (DC) for simultaneously communicating between a UE and each of two NG-RAN nodes.

The radio signal transmission and reception unit 210 may also transmit a physical uplink shared channel. In this embodiment, the radio signal transmission and reception unit 210 may constitute transmission unit.

Specifically, the radio signal transmission and reception unit 210 may transmit PUSCH toward the network (gNB100). The radio signal transmission and reception unit 210 may support repetition of PUSCH.

Multiple types of repetitive transmission of PUSCH may be specified. Specifically, repetition type A and repetition type B may be specified. Repetition type A may be interpreted as a form in which a PUSCH allocated in a slot is repeatedly transmitted. That is, a PUSCH is less than or equal to 14 symbols and may not be allocated across multiple slots (adjacent slots).

On the other hand, the repetition type B may be interpreted as the repeated transmission of a PUSCH to which more than 15 symbols of PUSCH may be assigned. In this embodiment, it may be permitted to allocate such a PUSCH across multiple slots.

In addition, the radio signal transmission and reception unit 210 may repeatedly transmit an uplink channel (UL channel) in a specific period of more than one slot. The uplink channel may include a physical uplink shared channel (PUSCH) and a physical uplink control channel (PUCCH). The shared channel may be referred to as a data channel.

A specific period of more than one slot may be interpreted as a period for a PUSCH (or PUCCH) repetition. For example, a specific period may be indicated by the number of Repetitions or it may be the time when a specified number of Repetitions are performed.

Alternatively, the radio signal transmission and reception unit 210 may repeatedly transmit the UL channel a specified number of times. Specifically, the radio signal transmission and reception unit 210 may repeatedly transmit PUSCH (or PUCCH) a specified number of times.

The specified period and/or the specified number of times may be indicated by signaling from the network (It may be an upper layer of RRC or a lower layer such as DCI.) or may be preset in the UE200.

The radio signal transmission and reception unit 210 may also repeatedly transmit data series after multiple code blocks (CBs) have been concatenated via PUSCH. The data series may be replaced by other synonymous terms such as data blocks, bit series and bit series. The CB may be the CB after Cyclic Redundancy Checksum (CRC) processing, CB splitting, channel coding and rate matching.

The amplifier unit 220 is composed of PA (Power Amplifier)/LNA (Low Noise Amplifier), etc. The amplifier unit 220 amplifies the signal output from the modulation and demodulation unit 230 to a predetermined power level. The amplifier unit 220 also amplifies the RF signal output from radio signal transmission and reception unit 210.

The modulation and demodulation unit 230 performs data modulation/demodulation, transmission power setting and resource block allocation for each predetermined communication destination (such as the gNB 100). On the modulation and demodulation unit 230, Cyclic Prefix-Orthologous Frequency Division Multiplexing (CP-OFDM)/Discrete Fourier Transform-Spread (DFT-S-OFDM) may be applied. DFT-S-OFDM may be used not only for the uplink (UL) but also for the downlink (DL).

The control signal and reference signal processing unit 240 performs processing for various control signals transmitted and received by the UE200 and processing for various reference signals transmitted and received by the UE200.

Specifically, the control signal and reference signal processing unit 240 receives various control signals transmitted from the gNB100 via a predetermined control channel, such as control signals of a radio resource control layer (RRC). The control signal and reference signal processing unit 240 also transmits various control signals to the gNB100 via a predetermined control channel. The control signal and reference signal processing unit 240 performs processing using a reference signal (RS) such as a Demodulation Reference Signal (DMRS) and a Phase Tracking Reference Signal (PTRS).

DMRS is a known reference signal (pilot signal) between individual base stations and terminals for estimating a fading channel used for data demodulation. PTRS is a reference signal for individual terminals for estimating phase noise, which is a problem in high frequency bands.

In addition to DMRS and PTRS, the reference signal may include a Channel State Information-Reference Signal (CSI-RS), a Sounding Reference Signal (SRS), and a Positioning Reference Signal (PRS) for location information.

The channel also includes a control channel and a data channel. Control channels may include PDCCH (Physical Downlink Control Channel), PUCCH (Physical Uplink Control Channel), RACH (Downlink Control Information (DCI) including Random Access Channel, Random Access Radio Network Temporary Identifier (RA-RNTI)), and Physical Broadcast Channel (PBCH).

Data channels may also include PDSCH (Physical Downlink Shared Channel), and PUSCH (Physical Uplink Shared Channel). Data may mean data transmitted through a data channel.

The control signal and reference signal processing unit 240 may also transmit to the network the capability information of the UE200 regarding the assignment of a physical uplink shared channel (PUSCH). In this embodiment, control signal and reference signal processing unit 240 may configure a transmission unit to transmit the capability information.

Specifically, the control signal and reference signal processing unit 240 may transmit UE Capability Information about the assignment of PUSCH (which may include Repetition) to the gNB100. Details of UE Capability Information will be described later.

The control signal and reference signal processing unit 240 can also receive control information indicating the allocation in the time domain of the PUSCH. In this embodiment, the control signal and reference signal processing unit 240 may constitute a reception unit.

Specifically, the control signal and reference signal processing unit 240 may receive downlink control information (DCI) indicating the allocation in the time domain of the PUSCH.

The encoding/decoding unit 250 performs data division/concatenation and channel coding/decoding for each predetermined communication destination (gNB100 or other gNB).

Specifically, the encoding/decoding unit 250 divides the data output from data transmission and reception unit 260 into predetermined sizes and performs channel coding on the divided data. The encoding/decoding unit 250 also decodes the data output from the modulation and demodulation unit 230 and concatenates the decoded data.

The data transmission and reception unit 260 transmits and receives Protocol Data Units (PDU) and Service Data Units (SDU). Specifically, the data transmission and reception unit 260 performs assembly/disassembly of PDUs/SDUs in multiple layers (Media access control layer (MAC), radio link control layer (RLC), and packet data convergence protocol layer (PDCP), etc.). The data transmission and reception unit 260 also performs error correction and retransmission control of data based on a hybrid automatic repeat request (ARQ).

The control unit 270 controls each functional block that constitutes the UE200. Specifically, in this embodiment, the control unit 270 controls transmission of the UL channel, specifically, PUSCH and PUCCH.

Specifically, the control unit 270 can make the UL channel hop in the frequency direction in units of specific periods of more than one slot. Hopping in the frequency direction of the UL channel may be referred to as frequency hopping, and frequency hopping in units of specific periods of more than one slot may be referred to as inter-slot frequency hopping. Note that hopping may mean that the frequency resources used change. In short, it may mean that subcarriers, resource blocks, resource block groups or BWPs change.

Also, the control unit 270 may cause the UL channel to hop in the frequency direction in units of a specific number indicating the number of repeated transmissions of the UL channel. Specifically, the control unit 270 may perform frequency hopping in units of the number of repeated transmissions (the number of Repetitions) of a specified UL channel, in other words, for every prescribed number of Repetitions.

When the joint channel estimation in gNB100 is applied and the transmissions of UL channels (PUSCH and PUCCH) overlap (may be expressed as a case of a collision), the control unit 270 may determine a pattern of frequency hopping using allocable resources avoiding duplication at the time of resource allocation (which may be expressed as a repetition of the UL channel), specifically, at the time of DCI reception.

Alternatively, when the transmissions of UL channels (PUSCH and PUCCH) overlap, the control unit 270 may determine a hopping pattern using allocable resources avoiding duplication at the time of the first Repetition of the UL channel, specifically, at the time of transmission of the first Repetition.

The control unit 270 may also set a hopping pattern for the UL channel Repetition as described above based on signaling from the network.

The control unit 270 may determine the allocation of DMRS transmitted on the UL channel, specifically PUSCH, based on the state of the PUSCH repetition, that is, the number of Repetitions, the Repetition period, etc.

Specifically, the control unit 270 may transmit the same symbol for DMRS (OFDM symbol) for each prescribed number of Repetitions. Moreover, the control unit 270 may set each symbol for DMRS to be used (OFDM symbol) for each prescribed number of Repetitions.

The control unit 270 may allocate PUSCH across multiple slots, i.e., support TBOMS, as described above. When supporting TBoMS, the control unit 270 may determine the transport block (TB) to be transmitted via PUSCH based on the DCI (control information) received by the control signal and reference signal processing unit 240.

To span multiple slots may mean that two or more consecutive slots are allocated to PUSCH. In addition, symbols or subframes may be used as a unit instead of slots.

The control unit 270 may determine the size of the transport block (TB) transmitted via the PUSCH based on the configuration information of the PUSCH in the serving cell. For example, the control unit 270 may determine the size of the TB based on the PDSCH-ServingCellConfig, which is the information element (IE) of the RRC layer. However, if it is related to the configuration information of PUSCH, it may be other information elements of the RRC layer, or it may not necessarily be limited to serving cells. The control unit 270 may also determine the size of the TB based on the configuration information about PUSCH of other layers other than the RRC layer.

The control unit 270 may also determine the division of the TB transmitted via PUSCH into multiple code blocks (CBs) based on whether or not to allocate PUSCH across multiple slots. For example, the control unit 270 may divide a TB into multiple CBs (up to 8) as in 3GPP Releases-15, 16. Alternatively, the control unit 270 may change the maximum number of divisions to the CB according to the number of slots (or symbols) to which PUSCH is allocated.

The control unit 270 may also determine the modulation and coding scheme to be applied to PUSCH based on whether or not PUSCH is allocated across multiple slots. Specifically, the control unit 270 allocates PUSCH across multiple slots, that is, in the case of TBoMS, a specific Quadrature Amplitude Modulation (QAM) may be applied as the modulation scheme, or a specific Modulation and Coding Scheme (MCS) may be applied.

Also, the functions related to DMRS transmission/reception and TBOMS described above may be provided in the gNB100. For example, the gNB100 (radio signal transmission and reception unit 210) may constitute a reception unit that receives a UL channel that is repeatedly transmitted from the UE200 within a specified period of time. The radio signal transmission and reception unit 210 of the gNB100 may receive a hopped UL channel in the frequency direction in units of the specified period of time.

The gNB100 (radio signal transmission and reception unit 210) may also receive a specified number of repeated transmissions from the UE200, that is, a UL channel (For example, PUSCH) on which a repetition is performed. In this case, the gNB100 (radio signal transmission and reception unit 210) may receive a UL channel hopped in the frequency direction in units of the specified number of times.

The gNB100 (control unit 270) may use the DMRS assigned to the multiple slots to construct a UL channel assigned to the multiple slots, for example, a control unit that performs joint channel estimation of PUSCH.

The gNB100 (control unit 270) may also perform TBOMS for processing TB via UL channels assigned to the multiple slots, that is, control over reception of UL channels such as PUSCH assigned across multiple slots.

(3) Operation of Radio Communication System

Next, the operation of radio communication system 10 will be described. The operation related to channel estimation of the uplink channel for the purpose of coverage performance will be described.

(3.1) Assumptions

As described above, TBOMS may be interpreted as a technique for transmitting a single transport block using multiple slots.

Figure 4:
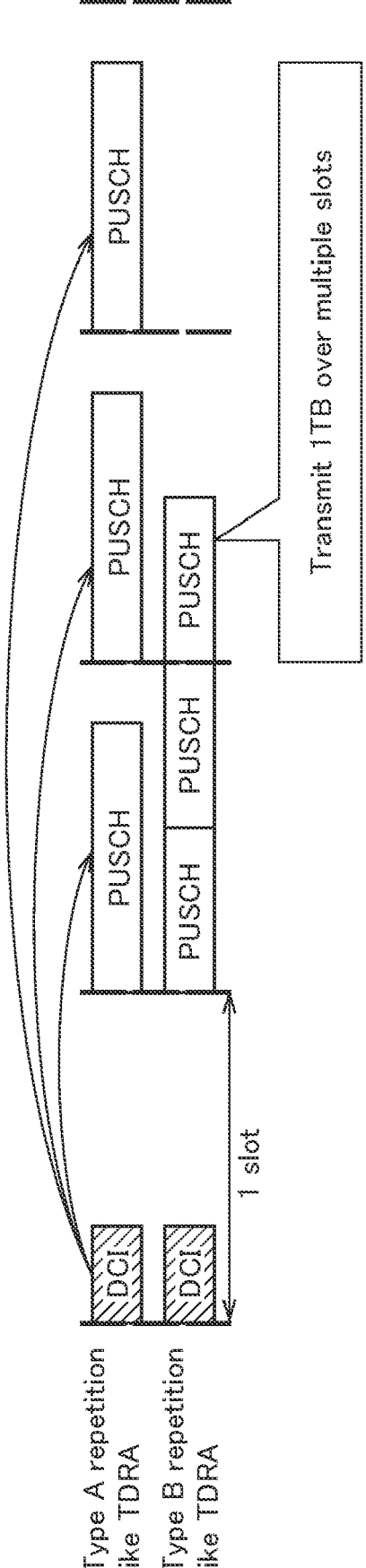
FIG. 4 shows an example of PUSCH allocation by TBOMS.

FIG. 4 shows an example of PUSCH allocation by TBOMS. Specifically, FIG. 4 shows an example of PUSCH allocation by TBoMS according to Type A repetition-like TDRA and Type B repetition-like TDRA. Types A and B are described above. Repetition types A and B may mean.

TBOMS may have the following advantages:

Resources are allocated across multiple slots, which reduces the coding rate (code rate).

Longer code sequences improve the gain of channel coding.

The amount of upper layer headers can be reduced compared to the case of transmitting multiple TBs.

Also, as in 3GPP Release-15, when determining the size (TBS) of TBs to be transmitted via PUSCH (as well as PDSCH), the number of RES ($N_{RE}$) is calculated first, and then the number of information bits ($N_{info}$) is calculated using the calculated $N_{RE}$. The TBS is then determined based on the calculated $N_{info}$. Here, the TBS determination assumes that PUSCH is allocated to only one slot.

Figure 5:
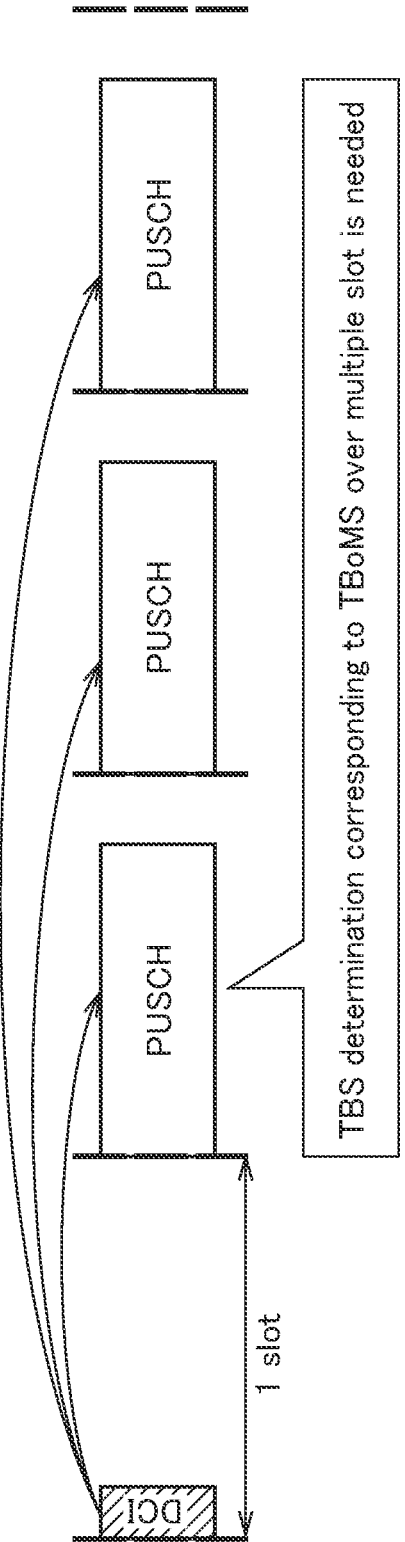
FIG. 5 is an illustration of the problems in the example of PUSCH allocation by TBoMS (Type A repetition like TDRA).

FIG. 5 is an illustration of the problems in the example of PUSCH assignment by TBoMS (Type A repetition like TDRA). As shown in FIG. 5, in the case of TBOMS, the TBS size corresponding to the PUSCH allocated across multiple slots (which may be continuous) needs to be determined.

(3.2) Overview of Operation

The following operation examples are described.

(Operation example 1): How to allocate time space for PUSCH when applying TBOMS
(Operation example 2): How to transmit 1 TB in multiple slots (Operation example 3): How to determine TBS when applying TBOMS
  (Operation example 3-1): Extend the number of REs to multiple slots instead of one slot when calculating $N_{RE}$
  (Example 3-2): $N_{RE}$ calculated based on TDRA'S SLIV (Start and Length Indicator Value) and $N_{info}$ calculated according to TDRA
(Example 4): How to determine the number of code blocks during TBOMS
(Example 5): How to select MCS table during TBOMS
(Example 6): Frequency hopping during TBOMS
  (Example 6-1): Frequency hopping (Type A repetition like TDRA)
  (Example 6-2): Frequency hopping (Type B repetition like TDRA)
  (Example 6-3): Hopping pattern when dropping a repetition resource
  (Example 6-4): How to receive information related to frequency hopping
(Example 7): Applied to Msg3 PUSCH
  (Example 7-1): Joint channel estimation applicable to Msg3
(Example 8): UE capability notification

(3.3) Example 1

In this example, the operation related to the allocation of the PUSCH time domain when applying TBOMS is described.

When executing the TDRA of TBOMS, the UE200 may notify the network (radio base station) of the allocation method of the PUSCH time domain by either of the following:

(Opt 1): Notifies to consolidate the multiple Repetitions to be allocated into one Repetition of TBOMS PUSCH
(Opt 2): Independently of Repetition, notifies the number of slots (or the number of Repetitions) to be allocated by the PUSCH used to transmit one TB (1 TB) (or alternatively, the network may give such a notification to the UE200 and the UE200 may operate on such a notification (hereafter the same).

Figure 6:
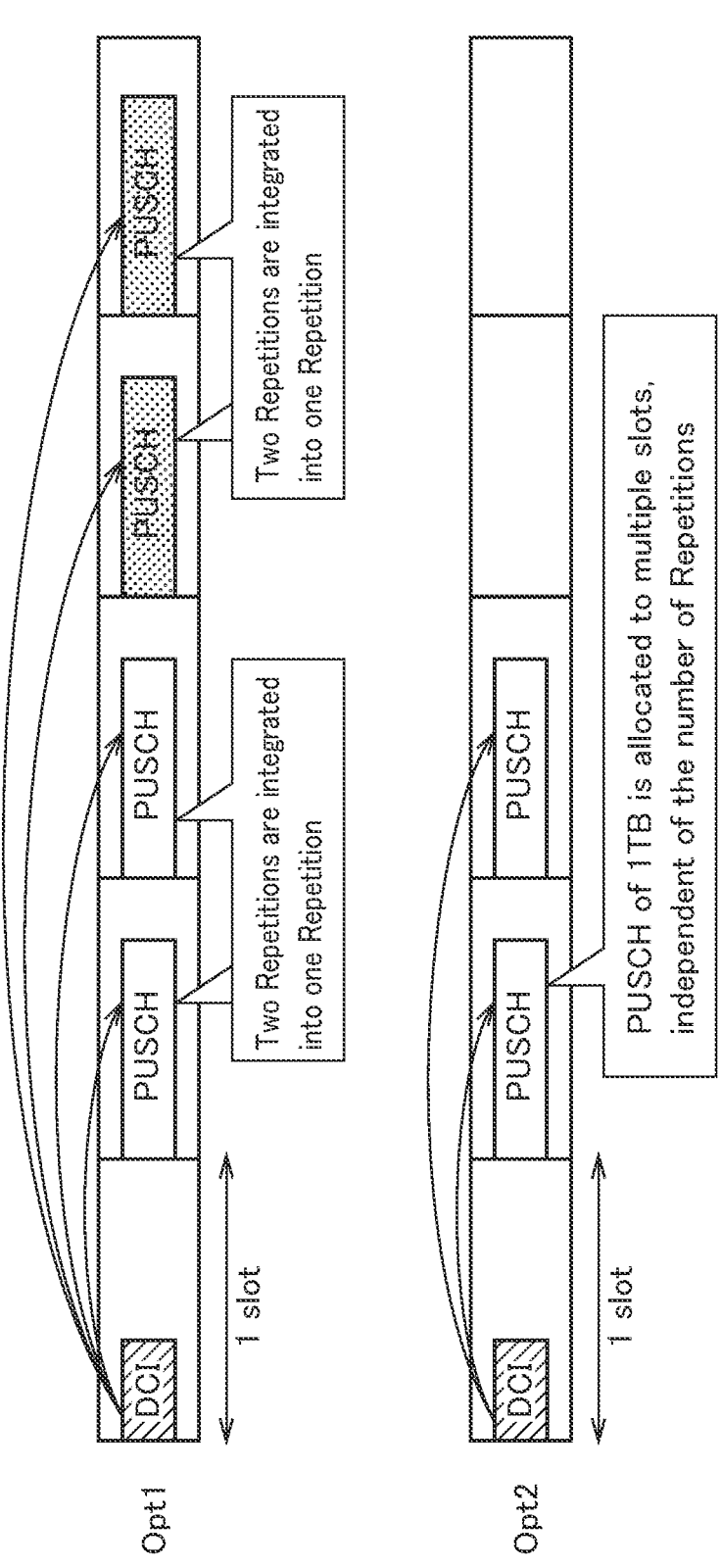
FIG. 6 is a diagram showing an allocation example of the PUSCH time domain in operation example 1 (Opt 1, 2).

FIG. 6 shows an allocation example of the PUSCH time domain in operation example 1 (Opt 1, 2). As shown in FIG. 6, multiple Repetitions may be integrated into one Repetition (Opt 1), and PUSCH for 1 TB may be allocated to multiple slots, independent of the number of Repetitions.

(Opt 2-1): The number of slots (or Repetitions) is notified by upper layer signaling In this case, the number of Repetitions may be either the actual number of Repetitions to be allocated or the number of Repetitions before dropping the Repetition resource. For such signaling, for example, PUSCH-Config IE or Config-uredGrantConfig IE of the RRC layer may be used.

(Opt 2-2): Use DCI to inform number of slots (or number of repetitions)

In this case, the number of slots may be the actual number of slots that can be allocated or the number of consecutive slots before dropping a Repetition resource.

(Opt 2-2-1): Notify explicitly using DCI For example, TBoMS-related information may be added as an element of the TDRA table in the RRC layer.
(Opt 2-2-2): Implicitly notify using DCI For example, a DCI field may be notified by linking TBoMS-related information. Alternatively, a DCI for resource allocation may be notified by linking TBOMS-related information to the CCE (Control channel element)

index where the DCI is located. In this case, the linking method may be notified by upper layer signaling or determined by prescribed rules.

(3.4) Example 2

In this example, the operation of transmitting 1 TB in multiple slots will be described. The UE200 may transmit 1 TB using multiple slots by either:

(Alt 1): transmitting a 1-bit sequence after a code block (CB) concatenation across multiple slots Specifically, a 1-bit sequence may be split and the split sequence may be transmitted using a specified resource across multiple slots.

(Alt 1-1): Send 1-bit sequence via multiple PUSCHs (Alt 1-2): Assign a single PUSCH to multiple slots (Alt 2): Repeatedly send series after CB concatenation Multiple series may be allocated using resources specified across multiple slots (similar to Repeat). In this case, the same series may be transmitted repeatedly or different series may be transmitted.

CRC attachment, CB segmentation, CRC attachment per CB, Channel coding, Rate matching, and CB concatenation may be processed in this order.

(Alt 1-1-1): Send an equally-segmented bit sequence via each PUSCH (Alt 1-1-2): Determine the bit length to send according to the symbol length of each PUSCH For example, if segmentation occurs in Type B repetition-like TDRA, a bit sequence of different bit lengths may be sent in each Repetition.

Figure 7:
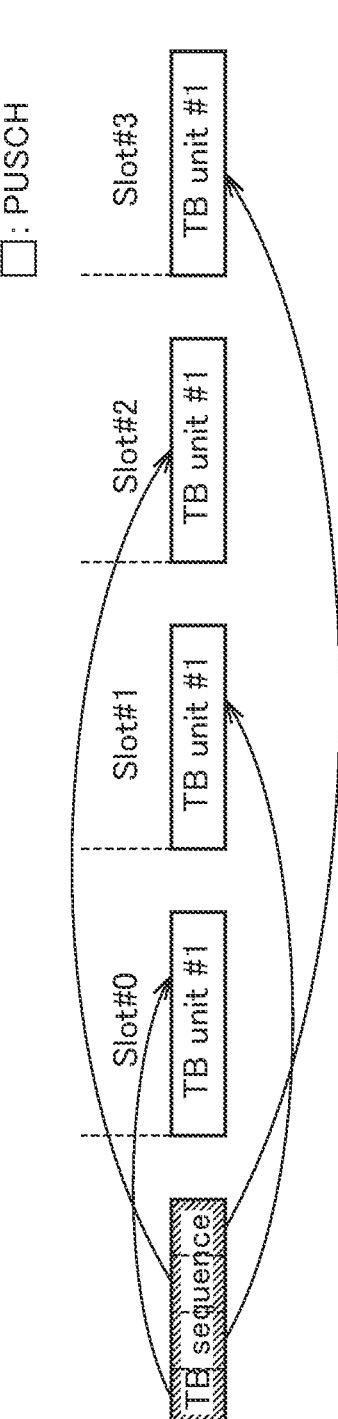
FIG. 7 shows an example of PUSCH (TB) allocation in operation example 2 (Alt 1-1-1).

FIG. 7 shows an allocation example of PUSCH (TB) in operation example 2 (Alt 1-1-1).

(Alt 2-1): Use conventional bit selection when rate matching (Alt 2-2): Apply new bit selection when rate matching For example, five or more redundancy versions (RVs) may be provided, and one may be selected during bit selection.

Figure 8:
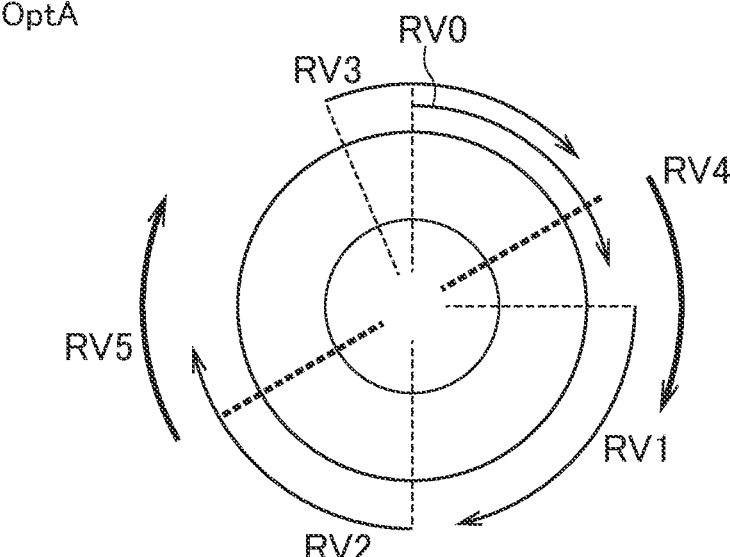
FIG. 8 shows an example of a configuration of redundancy version (RV) for operation example 2 (Alt 2-2).
Figure 8:
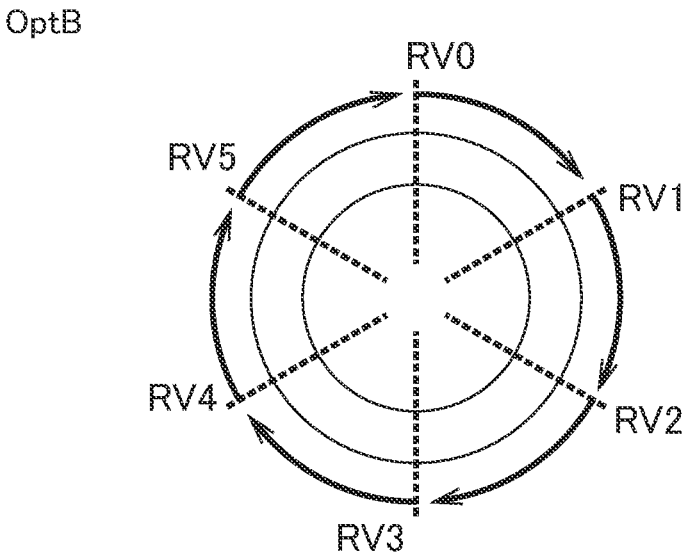

(Opt A): Add an RV with a different starting point to an existing RV with a starting point assigned (Opt B): Assign a new starting point to each RV FIG. 8 shows an example configuration of redundancy version (RV) for operation example 2 (Alt 2-2). As shown in FIG. 8, an RV to which an existing starting point is assigned (RV0~3) and an RV to which a different starting point is assigned (RV4, 5) may be used (Opt A), or each RV may be newly assigned a starting point (Opt B).

(3.5) Example 3

In this operation example, the operation related to the determination of TBS when applying TBOMS is described.

Specifically, the decision of TBS corresponding to TB spanning multiple slots will be described.

(Opt 1): When calculating $N_{RE}$, expand the number of REs in multiple slots instead of one slot (operation example 3-1).

Specifically, $N_{RE}$ (N'RE) may be calculated as follows.

$$N'_{RE} = N^{RB}_{sc} \cdot N^{sh}_{symb} - N^{PRB}_{DMRS} - N^{PRB}_{oh}$$

Here, each variable may be changed to the number of REs that span multiple slots.

(Opt 2): $N_{RE}$ is calculated based on SLIV of TDRA and $N_{info}$ is calculated according to TDRA (working example 3-2)

(Alt 1): For Type A repetition-like TDRA, calculate a one-slot $N_{RE}$ and multiply the number of repeat transmissions during the $N_{info}$ calculation In this case, the number of slots may be calculated taking into account the slots to be dropped (multiply the number of slots available for allocation). If there is a TDD pattern, Slot Format Indication (SFI)/Cancel Indication (CI), etc., it may be changed from the value notified by the TBS being transmitted or received.

(Alt 2): For Type B repetition-like TDRA, calculate the $N_{RE}$ for one Repetition and multiply the number of repeat transmissions when calculating $N_{info}$ (Opt 1): Multiply the number of actual repetitions. In this case, the number of unsegmented actual repetitions may be multiplied.

(Opt 2): Multiply the number of nominal repetitions.

Note that the actual repetition is the repetition that is finally transmitted, and the nominal repetition may be interpreted as the repetition that the gNB notifies/assigns to the UE. For example, the actual repetition and the nominal repetition may vary depending on the following factors:

(i) If the nominal repetition is not placed on the UL symbol, the nominal repetition may be excluded.

(ii) If the nominal repetition is placed on the slot boundary, the nominal repetition may be split at the slot boundary and turned into two actual repetitions.

(Alt 3): Add a given parameter (DCI or upper layer signaling may be used to inform the parameter)

For example, a given parameter (K) may be added when calculating the value of $N_{info}$ as follows: For example, K may be a value that multiplies the $N_{info}$ value by K (a scaling factor), but is not necessarily limited to such purposes.

$$N_{info} = N_{RE} \cdot R \cdot Q_m \cdot \upsilon \cdot K$$

(3.5.1) Example 3-1

In this example, the number of REs in multiple slots rather than one slot may be expanded when calculating $N_{RE}$.

In this case, $N^{PRB}_{oh}$ may be calculated by any of the following:

(Opt 1): Set same $N^{PRB}_{oh}$ in all slots (Opt 1-1): Assigns xOverhead set by PDSCH-Serving-CellConfig to each slot (Opt 1-2): The xOverhead set by PDSCH-ServingCell-Config divided by the number of slots to which TBoMS is applied is set as $N^{oh}_{PRB}$ in each slot In this case, the quotient may be arranged to an integer by ceil or floor.

(Opt 1-3): Add a new parameter and determine $N^{oh}_{PRB}$ based on that parameter when using TBOMS (Opt 1-4): Add a new parameter and determine $N^{oh}_{PRB}$ based on that parameter and xOverhead when using TBOMS (Opt 2): Set $N^{oh}_{PRB}$ based on the number of slot symbols to which TBOMS applies (Opt 2-1): Multiply xOverhead by the number of slots to which the resource is allocated (Type A repetition like TDRA)

(Opt 2-2): Multiply xOverhead by the number of repeat transmissions (Type B repetition like TDRA)

(Opt 2-2-1): Multiply the number of actual repetitions.

In this case, the number of undivided actual repetitions may be multiplied.

(Opt 2-2-2): Multiply the number of nominal repetitions.

(Opt 2-3): Calculate according to the SLIV of the TDRA and the number of symbols to be allocated, the total number of symbols allocated and xOverhead For example, it may be calculated by (xOverhead) (the total number of symbols)/(the number of symbols to be allocated with the SLIV of the TDRA).

Also, in Opt 2-1, 2-2, 2-3, different parameters may be used instead of xOverhead, even set by PDSCH-Serving-CellConfig. For example, $N_{PRB}{}^{oh}$ may be calculated based on the added parameters and xOverhead, both slot symbol counts. In this case, separate parameters may be set when TBoMS is applied and when it is not.

Also, for the calculation of $N^{sh}{}_{symb}$ ($^{NPRB}{}_{DMRS}$), either of the following may be applied:

(Alt 1): change to the number of symbols (RE) of all resources to which the resource is allocated In this case, the number of symbols (RE) may be calculated taking into account the TDD pattern, SFI and CI.

(Alt 2): Multiply the number of slots to which the resource is allocated (Type A repetition like TDRA)

(Alt 3): Multiply the number of repeat transmissions (Type B repetition like TDRA)

(Opt 1): Multiply the number of actual repetitions.

In this case, the number of undivided actual repetitions may be multiplied.

(Opt 2): Multiply the number of nominal repetitions.

Figure 9:
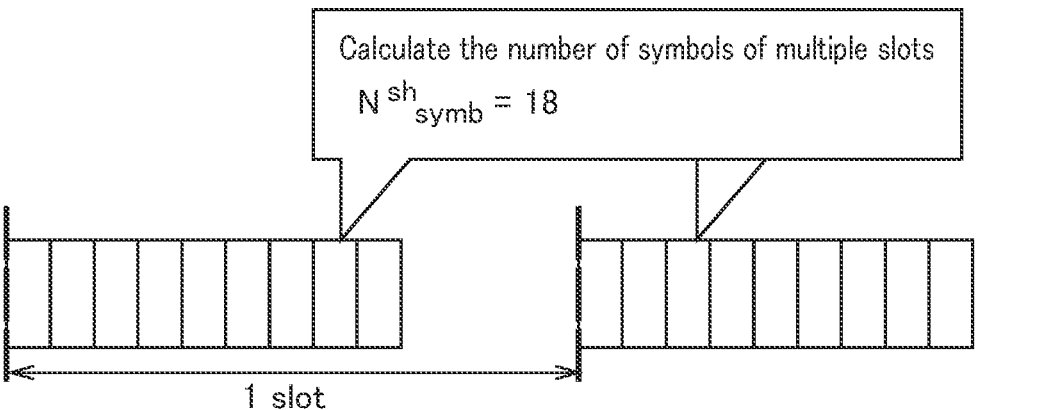
FIG. 9 shows a calculation example of $N^{sh}_{symb}$ for operation example 3-1 (Opt 1).

FIG. 9 shows a calculation example of $N^{sh}{}_{symb}$ according to operation example 3-1 (Opt 1). As shown in FIG. 9, the number of symbols (18) for multiple slots may be calculated.

(3.6) Example 4

In this operation example, the operation related to the determination of the number of code blocks during TBOMS is described.

The 1 TB for TBOMS may be divided into CBs by any of the following methods:

(Alt 1): No division of CBs when using TBoMS No division of CBs regardless of maxCodeBlock-GroupsPerTransportBlock set by RRC (Alt 2): Split 1 TB into multiple CBs (up to 8CB) as in 3GPP Release 15, 16

In this case, the maximum number of maxCodeBlock-GroupsPerTransportBlock may be increased. In addition, the maximum number of CBs when using TBOMS may be set individually.

(Alt 3): the maximum number of CB divisions may be changed according to the number of slots (number of symbols)

In this case, the maximum number of CBs may be changed accordingly depending on the number of slots (number of symbols) to which 1 TB is allocated. For example, the number of slots to which 1 TB is allocated may be multiplied by the maximum number of CBs set by the RRC.

Figure 10:
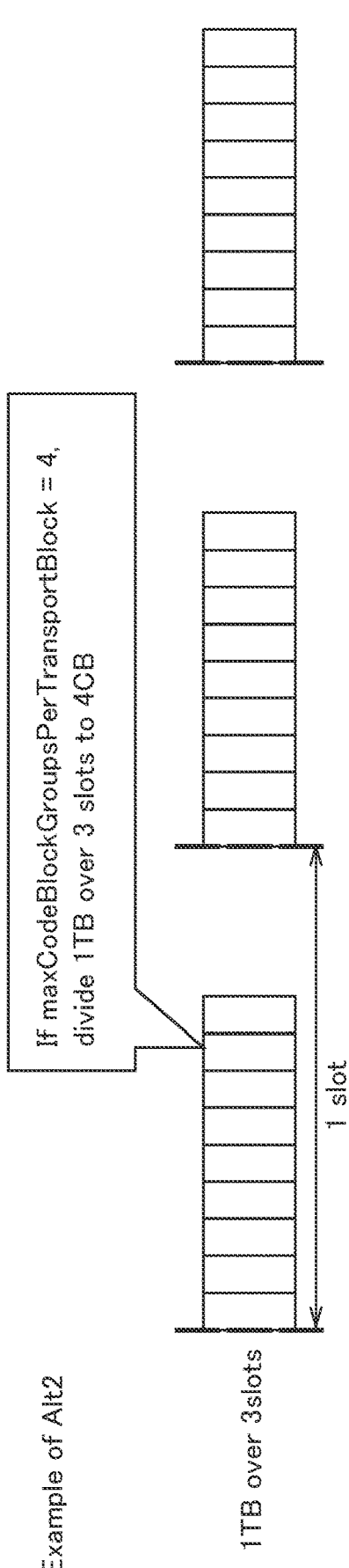
FIG. 10 shows an allocation example of TB according to operation example 4 (Alt 2).

(Alt 4) sets the number of CBs according to the number of Repetitions when allocating resources FIG. 10 shows an allocation example of TB according to operation example 4 (Alt 2). As shown in FIG. 10, when maxCodeBlockGroupsPerTransportBlock=4, one TB across three slots may be divided into four CBs.

(Alt 4-1): Multiply the number of repeated placements by the maximum number of CBs (Alt 4-2): Set the number of repeated placements to the maximum number of CBs Note that the maximum number of CBs may be limited to 8 for Alt 3 and Alt 4 so that they can be accommodated by conventional DCI.

Figure 11:
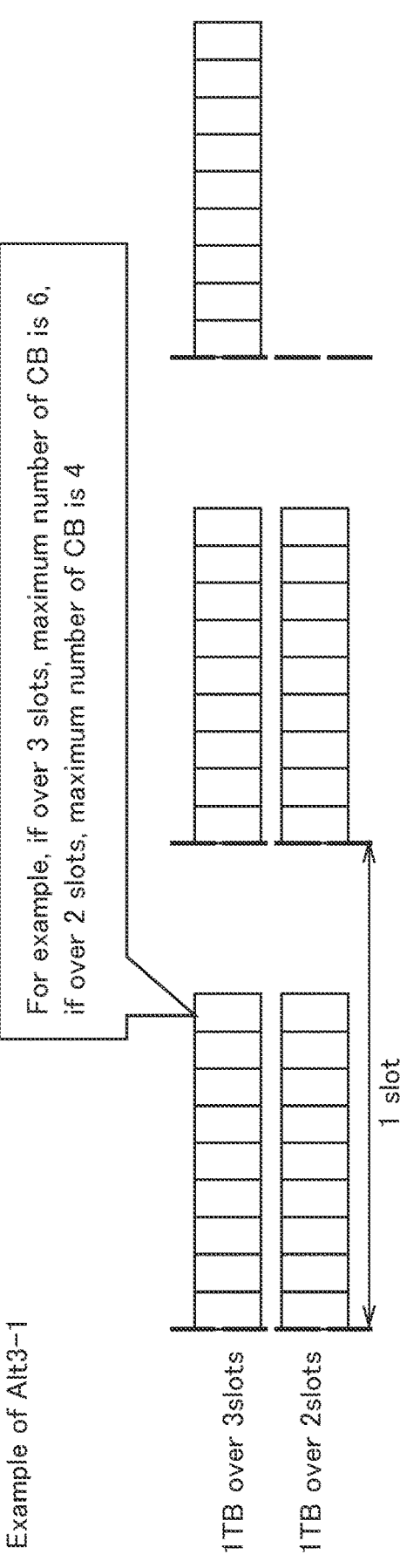
FIG. 11 is a diagram showing an allocation example of TB according to operation example 4 (Alt 4-1).

FIG. 11 shows an allocation example of TB according to operation example 4 (Alt 4-1). As shown in FIG. 11, when 1 TB spans 3 slots, the maximum number of CBs may be 6, and when it spans 2 slots, the maximum number of CBs may be 4.

(3.7) Example 5

In this operation example, the operation related to MCS table selection when using TBOMS is described. For MCS table when using TBOMS, either of the following operations may be applied.

(Alt 1): fixed to qam 64 low SE MCS table when using TBOMS

Specifically, fixed to qam 64 low SE MCS table when using TBoMS with or without MCS-C(Cell)-RNTI. Such operation may be applied to Msg3. Msg3 is a message of a RACH (Random Access Channel) procedure, and PUSCH may be used to transmit Msg3.

(Alt 2): enables new low SE MCS table when using TBOMS

Specifically, a new MCS table may be utilized when using TBOMS. When using C-RNTI, any of the following MCS tables may be specified by prescribed rules, higher layer signaling or DCI:

Existing MCS tables qam 64 low SE MCS tables

New MCS tables

In addition, when using MCS-C-RNTI, any of the following MCS tables may be specified by prescribed rules, higher layer signaling or DCI:

qam 64 low SE MCS table

New MCS table

The MCS table may be implicitly selected according to the MCS index, TDRA or transmit power.

(3.8) Example 6

(3.8.1) Example 6-1

In this example, the operation related to frequency hopping when using TBOMS is described.

When applying TBOMS, the UE200 may determine the hopping pattern of the UL channel from the following hopping patterns specified by the network (radio base station) or according to a predetermined rule (setting). The UL channel may mean either PUSCH or PUCCH (hereinafter the same). Also, the UL channel may include a repeated PUSCH or PUCCH.

Specifically, the UE200 may determine one of the following hopping patterns when applying Type A repetition-like TDRA or using PUCCH:

(Opt 1): frequency hopping per slot (Opt 2): frequency hopping within a slot (Opt 3): frequency hopping only once within a Repetition transmission (Opt 3-1): computing a unique hop duration based on the number of Repetition transmissions In this case, frequency hopping may be avoided based on the number of repeated transmissions on the UL channel. The number of repetitions may also be the actual number of repetitions to be allocated or the number of repetitions before dropping a Repetition resource. Note that the dropping of a Repetition resource may be interpreted as a resource (a time resource and/or a frequency resource) that is not allocated due to a conflict (duplication of allocation) between that Repetition resource and other UL channel resources.

For example, the hop duration may be determined by first hopping duration=floor (number of Repetitions/2) or ceil (number of Repetitions/2).

(Opt 3-2): Informs slot position for frequency hopping

For example, the UE200 may inform the network of duration per hop=X number of slots (X number of repetitions), send X repetitions (X repetitions sent, same below) and then frequency hopping. Alternatively, the network may make the notification to the UE200 and the UE200 may operate on the basis of the notification (hereinafter the same).

The number of slots may also be the number of slots actually allocated by the Repetition or the number of slots before the Repetition resource is dropped.

FIG. 12 shows an example of the UL channel's Repetition in operation example 6 (Opt 3). As shown in FIG. 12, the hop period may be determined as floor (number of Repetitions (Rep) (6)/2)=3. In FIG. 12, each frame in the time (t) direction may be interpreted as corresponding to a slot (However, symbols may also be used).

The hop duration may be expressed in terms such as duration hop, hopping duration or duration per hop, and may be indicated by a time length or the number of repetitions.

(Opt 4): frequency hopping per X slot (Opt 4-1): duration per hop reported by the network For example, duration per hop=X number of slots, and frequency hopping per X slot is allowed.

(Opt 4-2): Determine the hopping pattern based on the number of slots (which may be the number of symbols) to which joint channel estimation is applied.

For example, if the time window size is 3 slots, frequency hopping may be performed every 3 slots. The time window size may be either in units of slots or in units of other time domains, such as symbols (hereafter the same).

(Opt 4-3): Determine duration per hop based on number of repeated transmissions (Opt 4-4): Determine hopping pattern based on number of repeated transmissions and number of slots (may be number of symbols) to which joint channel estimation is applied FIG. 13 shows an example of UL channel repetition in operation example 6-1 (Opt 4). As shown in FIG. 13, frequency hopping (X=2) may be performed every two slots.

(3.8.2) Example 6-2

In this example, the operation related to frequency hopping (Type B repetition-like TDRA) when TBoMS is applied is described.

The UE200 may determine the hopping pattern of the UL channel from the following hopping patterns specified by the network (radio base station) or according to a predetermined rule.

Specifically, the UE200 may determine one of the following hopping patterns when applying the Type B repetition-like TDRA:

(Opt 1): frequency hopping per slot (Opt 2): frequency hopping per Repetition (Opt 3): frequency hopping only once in a Repetition transmission (Opt 4): frequency hopping per X slot FIG. 14 shows an example of UL channel Repetition pertaining to operation example 6-2 (Opt 3, 4). Specifically, the upper side of FIG. 14 shows an example of UL channel Repetition pertaining to Opt 3, and the lower side of FIG. 14 shows an example of UL channel Repetition pertaining to Opt 4.

As shown in FIG. 14, the hop period may be determined as floor (number of Repetitions (10)/2)=5, or frequency hopping (X=2) every two slots. Also, as shown in FIG. 14, in the case of Type B repetition-like TDRA, multiple Repetitions (Rep) may be repeated in a slot, or multiple Repetitions may be assigned in the same slot.

(Opt 5): frequency hopping for each X Repetition (Opt 5-1): duration per hop reported by the network For example, the UE200 may notify as duration per hop=X number of repetitions, and frequency hopping for each X repetition.

(Opt 5-2): Determine the hopping pattern based on the number of slots (which may be the number of symbols) to which the joint channel estimation is applied.

For example, if the time window size is 3 slots, frequency hopping may be performed every 3 slots. The time window size may be a time domain to which joint channel estimation is applicable, and may be in units of slots or other time domains, such as symbols.

FIG. 15 shows an example of UL channel Repetition in operation example 6-2 (Opt 5). As shown in FIG. 15, frequency hopping may be performed every 3 slots. Also, as shown in FIG. 15, the timing of hopping may be in the slot (in the middle), not at the slot boundary.

(3.8.3) Example 6-3

In this example of operation, the operation related to the hopping pattern at the time of dropping the Repetition resource is described when TBOMS is applied. FIG. 16 shows an example of the UL channel Repetition related to operation example 6-3 (Alt 1, 2).

A UE200 may apply one of the following hopping patterns when joint channel estimation is applied (on the radio base station side) and the Repetition resource of the UL channel (For example, PUSCH) collides (may be called overlap) with a different resource (For example, resources for PUCCH).

(Alt 1): Apply hopping pattern without considering resource collisions

In this case, the hopping pattern may be applied on a per-slot basis without considering when resources are dropped. For example, if a second Repetition resource is dropped, a similar hopping pattern may be maintained (Upper reference in FIG. 16, dotted line indicates dropped Repetition resource).

(Alt 2): apply hopping pattern based on actual resources being sent

In this case, a hopping pattern may be applied based on the resources used to send each Repetition. For example, if a second Repetition resource is dropped, the hopping pattern may be applied except for the dropped resource (Lower reference in FIG. 10, resources in the frequency direction after slot #3 are different from Alt. 1 because the dropped Repetition resource (dotted line) is removed).

Note that when the hopping pattern is applied as described below, or when the number of repeat transmissions is specified based on the number of resources that can be allocated, Alt 1 and Alt 2 may be set separately.

FIG. 17 shows an example of UL channel Repetition in operation example 6-3 (Alt 3, 4).

(Alt 3): When allocating resources, the hopping pattern is applied based on the allocatable Repetition resource In this case, the allocatable resource may be determined according to the collision reason. For example, symbols in the TDD pattern, SS/PBCH block (Synchronization Signal/ Physical Broadcast Channel blocks) may be considered, but conflicts with repeated SFI (Slot Format Indication)/CI (Control Information)/PUCCH transmissions may not. Alternatively, drops in the repetition resource for which the radio base station (gNB100) is known may be considered, but drops that the radio base station is unable to determine may not.

(Alt 4): Hopping pattern is applied to the allocatable Repetition resource when the first Repetition is sent In this case, the allocatable resource may be determined according to the time conflict reason. As with Alt 3, for example, symbols in the TDD pattern, SS/PBCH block may be considered, but collisions with repeated SFI/CI/PUCCH transmissions may not. Alternatively, drops in the Repetition resource for which the radio base station is known may be considered, but drops that the radio base station is unable to determine may not.

(3.8.4) Example 6-4

In this example of operation, the UE200 may receive frequency hopping related information by any of the following methods:

(Opt 1): DCI (Opt 1-1): Explicit frequency hopping related information by field of DCI In this case, the association (mapping) between the frequency hopping related information and the DCI field may use higher layer signaling or may follow a pre-defined rule (setting).

(Opt 1-2): In the higher layer, the information element of the frequency hopping related information is added to the TDRA table and determined by the DCI (Opt 1-3): Implicit frequency hopping related information by the field of the DCI For example, the field of the DCI may be associated with frequency hopping related information. Alternatively, the control channel element (CCE) index where the DCI for resource allocation is located may be associated with frequency hopping related information.

(Opt 2): Upper layer signal

For example, a hopping pattern may be selected based on the frequency hopping-related information received in the RRC.

(Opt 3): Based on predetermined rules, a hopping pattern may be determined

For example, in the case of channel estimation using multiple slots, any option of the hopping pattern may be specified.

In addition, the UE200 may set the hopping pattern by any of the following methods.

Setting the number of slots to which the joint channel estimation is applied and the parameters of the hop duration separately or in common Setting the parameters separately or in common for Type A like repetition TDRA and Type B like repetition TDRA Type B like repetition Set the TDRA hop duration separately or in common with the number of slots and the number of repetitions

(3.9) Example 7

In this example, the operation related to the application of TBOMS to Msg3 PUSCH is described.

The UE200 may receive the relevant information of TBOMS for Msg3 initial transmission based on any of the following methods or combinations: In this case, the settings for TBOMS may be different depending on the frequency (band) used by the UE.

Notification to the UE200 by upper layer signaling

For example, PUSCH-ConfigCommon IE (Information Element) or RACH-ConfigCommon IE specified in the RRC layer may be used. Msg3 is a random access channel (RACH) procedure message, and PUSCH may be used to transmit Msg3.

Msg1 may also be transmitted via PRACH (Physical Random Access Channel). Msg1 may be referred to as PRACH Preamble. Msg2 may be transmitted via PDSCH. Msg2 may be referred to as RAR (Random Access Response). Msg3 may be referred to as RRC Connection Request. Msg4 may be referred to as RRC Connection Setup.

Notification to UE200 through Msg2 RAR

Any of the following methods may be applied:

(Alt 1): Enhanced UE is notified by sending a RAR with a MAC configuration different from the normal UE Enhanced UE may mean a UE that supports TBOMS.

(Alt 2): TDRA notification for UL grant (permit)

For example, an information element for channel estimation across multiple slots may be added to the TDRA table set in the RRC, and the information may be selected by the DCI.

(Alt 3): Implicitly notified with UL grant information

For example, it may be tied to a TPC (Transmit Power Control) command or MCS (Modulation and Coding Scheme). In this case, the association method may be set by a predetermined rule or network (radio base station).

(Alt 4): Notification using reserved bits

FIG. 18 shows a configuration example of the MAC RAR according to operation example 7. As shown in FIG. 18, a reserved bit (R) included in the MAC RAR may be used for the above notification. For example, only whether or not the TBOMS is used may be notified using the reserved bit.

In addition, TBoMS-related information may be added to the PUSCH-ConfigCommon information element TDRA table for notification by higher layer signaling.

Alternatively, for notification through DCI format 0_0 with CRC scrambled by TC-RNTI (Temporary C (Cell)-RNTI), either of the following may apply:

(Alt 1): Implicitly notify TBoMS-related information according to the CCE index where the DCI is located (Alt 2): Notifies TBoMS-related information using reserved bits of HARQ process number, New data indicator (Alt 3): Notifies implicitly by information notified by DCI For example, relevant information may be linked to TDRA, TPC command or MCS. In this case, the linking method may be set by a predetermined rule or network (radio base station).

Alternatively, RNTI for DCI with CRC scrambled by Enhanced UE may be used. RNTI for Enhanced UE may be allocated by RAR. TBOMS-related information may also be notified by DCI for Enhanced UE.

The UE200 may also report (notify) to the network (radio base station) whether or not to apply TBOMS when transmitting Msg3, or whether or not to apply TBOMS, based on either of the following methods:

(Opt 1): Report together with the applicability (or request) of repeated transmission of Msg3

When repeated transmission of Msg3 is performed, the applicability of TBOMS may be included.

(Opt 2): Report independently of applicability (or request) of repeated transmission of Msg3

(Opt 2-1): Allocate different initial bandwidths depending on applicability (or request)

(Opt 2-2): Use different RACH preambles depending on applicability (or request)

(Opt 2-3): Use different RACH occurrences depending on applicability (or request)

(Opt 2-4): Use a specific Orthogonal Cover Code (OCC) pattern in Msg1 sent repeatedly depending on applicability (or request)

(3.10) Example 8

In this example, an operation related to notification of UE capability is described.

For TBOMS, the UE200 may report the following contents to the network as UE Capability Information.

Applicability of repeated transmission of TBOMS PUSCH

Applicability of each RV extension when applying TBOMS

Applicability of new low SE MCS table when applying TBOMS

Applicability of each frequency hopping pattern when applying TBOMS

Applicability of TBOMS to Msg3PUSCH

A UE200 may report the frequency it supports (which may be FR or band) by any of the following methods:

Whether or not all frequencies can be supported together (whether or not it can be supported as a mobile station)

Whether or not each frequency can be supported

Whether or not each FR1/FR2 can be supported

Whether or not each SCS can be supported

In addition, the UE200 may report the corresponding duplex by any of the following methods:

Availability as a UE

Availability per duplex (TDD/FDD)

(4) Operational Effects

According to the above embodiment, the following operation effects can be obtained. Specifically, according to the UE200 (and gNB100) in the above operation example 1~8, a TBoMS that processes a transport block (TB) through a physical uplink shared channel (PUSCH) allocated to multiple slots can be more efficiently realized.

In particular, according to the above operation example, appropriate PUSCH placement considering TBOMS, TBS determination, code block determination, MCS table selection, frequency hopping, transmission of Msg3, and transmission of UE Capability Information can be realized.

(5) Other Embodiments

Although the above description of the embodiment is not limited to the description of the embodiment, it is obvious to those skilled in the art that various modifications and improvements are possible.

For example, in the above described embodiment, the term transport block (TB) was used, but as described below, it is a block of predetermined data and may be replaced by another synonymous term such as, for example, a data packet.

In the above described embodiment, the reference signal for demodulation (DMRS) used for channel estimation of PUSCH (or PUCCH) is described, but if it is a reference signal used for channel estimation of a physical channel such as PUSCH (or PUCCH), it may be another reference signal.

Also, in the above description, set, activate, update, indicate, enable, specify and select may be read as each other. Similarly, link, associate, correspond, map may be read as each other, and allocate, assign, monitor and map may be read as each other.

In addition, specific, dedicated, UE-specific and UE-specific may be read as each other. Similarly, common, shared, group-common, UE-common, and UE-shared may be read as interchangeable.

In addition, the block diagram (FIG. 3) used for the explanation of the above described embodiment shows blocks of functional units. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) for functioning transmission is called a transmission unit (transmitting unit) or a transmitter. In either case, as described above, the implementation method is not particularly limited.

Furthermore, the above-mentioned gNB100 and UE200 (the device) may function as a computer for processing the radio communication method of the present disclosure. FIG. 19 shows an example of the hardware configuration of the device. As shown in FIG. 19, the device may be configured as a computer device including a processor 1001, a memory 1002, a storage 1003, an communication device 1004, an input device 1005, an output device 1006, a bus 1007, etc.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

Each functional block of the device (see FIG. 3) is realized by any hardware element of the computer device or a combination of the hardware elements.

Moreover, the processor 1001 performs computing by loading a predetermined software (computer program) on hardware such as the processor 1001 and the memory 1002, and realizes various functions of the reference device by controlling communication via the communication device 1004, and controlling reading and/or writing of data on the memory 1002 and the storage 1003.

The processor 1001, for example, operates an operating system to control the entire computer. The processor 1001 may consist of a central processing unit (CPU) including interfaces with peripheral devices, controllers, arithmetic units, registers, etc.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. Memory 1002 may be referred to as a register, cache, main memory, etc. Memory 1002 may store programs (program code), software modules, etc., that are capable of executing a method according to one embodiment of this disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Each device such as a processor 1001 and a memory 1002 is connected by a bus 1007 for communicating information. The bus 1007 may be configured using a single bus or different buses for each device.

In addition, the device may include hardware such as a microprocessor, a digital signal processor (DSP), an application-specific integrated circuit (ASIC), a programmable logic device (PLD), or a field programmable gate array (FPGA), which may implement some or all of the functional blocks. For example, the processor 1001 may be implemented by using at least one of these hardware.

Also, the notification of information is not limited to the mode/embodiment described in this disclosure and may be made using other methods. For example, the notification of information may be carried out by physical layer signaling (e.g., Downlink Control Information (DCI), Uplink Control Information (UCI), higher layer signaling (e.g., RRC signaling, Medium Access Control (MAC) signaling, notification information (Master Information Block (MIB), System Information Block (SIB)), other signals or a combination thereof. The RRC signaling may also be referred to as an RRC message, e.g., an RRC Connection Setup message, an RRC Connection Reconfiguration message, etc.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing procedures, sequences, flowcharts, etc., of each mode/embodiment described in this disclosure may be reordered as long as there is no conflict. For example, the method described in this disclosure uses an illustrative order to present elements of various steps and is not limited to the specific order presented.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in this disclosure may be used alone, in combination, or switched over as practice progresses. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of the channels and symbols may be a signal (signaling). Also, the signal may be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)," "radio base station," "fixed station," "NodeB," "eNodeB (eNB)," "gNodeB (gNB)," "access point," "transmission point," "reception point," "transmission/reception point," "cell," "sector," "cell group," "carrier," "component carrier," and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)," "user terminal," "user equipment (User Equipment: UE)," "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The mobile body may be a vehicle (For example, cars, planes, etc.), an unmanned mobile body (For example, drones, self-driving cars, etc.) or a robot (manned or unmanned). At least one of a base station and a mobile station can be a device that does not necessarily move during the communication operation. For example, at least one of a base station and a mobile station may be an Internet of Things (IOT) device such as a sensor.

In addition, the base station in this disclosure may be read as a mobile station (user terminal, hereinafter the same). For example, each mode/embodiment of this disclosure may be applied to a configuration in which communication between a base station and a mobile station is replaced with communication between multiple mobile stations (For example, it may be called Device-to-Device (D2D), Vehicle-to-Everything (V2X), etc.). In this case, the mobile station may have the function of the base station. In addition, words such as "up" and "down" may be replaced with words corresponding to communication between terminals (For example, "side"). For example, terms an uplink channel, a downlink channel, or the like may be read as a side channel.

Similarly, mobile stations in this disclosure may be replaced with base stations. In this case, the base station may have the function of the mobile station. A radio frame may be composed of one or more frames in the time domain. Each frame or frames in the time domain may be referred to as a subframe. A subframe may be further configured by one or more slots in the time domain. Subframes may have a fixed length of time (For example, 1 ms) independent of numerology.

Numerology may be a communication parameter applied to at least one of transmission and reception of a certain signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

The slot may be configured with one or a plurality of symbols (Orthogonal Frequency Division Multiplexing (OFDM)) symbols, Single Carrier Frequency Division Multiple Access (SC-FDMA) symbols, etc.) in the time domain. A slot may be a unit of time based on the numerology.

A slot may include a plurality of minislots. Each minislot may be configured with one or more symbols in the time domain. A minislot may also be called a subslot. A minislot may be composed of fewer symbols than slots. A PDSCH (or PUSCH) transmitted in units of time larger than a minislot may be referred to as a PDSCH (or PUSCH) mapping type A. PDSCH (or PUSCH) transmitted using a minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called a transmission time interval (TTI), a plurality of consecutive subframes may be called TTI, and one slot or one minislot may be called TTI. That is, at least one of the subframes and TTI may be a subframe (1 ms) in an existing LTE, may have a duration shorter than 1 ms (For example, 1-13 symbols), or may have a duration longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (that is, one or more slots or one or more minislots) may be the minimum scheduling unit. In addition, the number of slots (number of minislots) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and frequency domain, and may include one or a plurality of continuous subcarriers in the frequency domain. The number of subcarriers included in RB may be, for example, twelve, and the same regardless of the topology. The number of subcarriers included in the RB may be determined based on the neurology.

Also, the time domain of RB may include one or a plurality of symbols, and may have a length of 1 slot, 1 minislot, 1 subframe, or 1 TTI. Each TTI, subframe, etc. may be composed of one or more resource blocks.

Note that, one or more RBs may be called a physical resource block (Physical RB: PRB), a subcarrier group (Sub-Carrier Group: SCG), a resource element group (Resource Element Group: REG), PRB pair, RB pair, etc.

A resource block may be configured by one or a plurality of resource elements (Resource Element: RE). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be identified by an index of RBs relative to the common reference point of the carrier. PRB may be defined in BWP and numbered within that BWP.

BWP may include UL BWP (UL BWP) and DL BWP (DL BWP). One or a plurality of BWPs may be configured in one carrier for the UE.

At least one of the configured BWPs may be active, and the UE may not expect to send and receive certain signals/channels outside the active BWP. Note that "cell," "carrier," and the like in this disclosure may be read as "BWP."

The above-described structures such as a radio frame, subframe, slot, minislot, and symbol are merely examples. For example, the number of subframes included in a radio frame, the number of slots per subframe or radio frame, the number of minislots included in a slot, the number of symbols and RBs included in a slot or minislot, the subcarriers included in RBs, and the number of symbols included in TTI, a symbol length, the cyclic prefix (CP) length, and the like can be changed in various manner.

The terms "connected," "coupled," or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access." In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on."

The "means" in the configuration of each apparatus may be replaced with "unit," "circuit," "device," and the like.

Any reference to an element using a designation such as "first," "second," and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include," "including," and variants thereof are intended to be inclusive in a manner similar to the term "comprising." Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

As used in this disclosure, the terms "determining," "judging" and "deciding" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. That is, "judgment" and "determination" may include regarding some action as "judgment" and "determination." Moreover, "judgment (decision)" may be read as "assuming," "expecting," "considering," and the like.

In the present disclosure, the term "A and B are different" may mean "A and B are different from each other." It should be noted that the term may mean "A and B are each different from C." Terms such as "leave," "coupled," or the like may also be interpreted in the same manner as "different."

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS 10 radio communication system
20 NG-RAN
100 gNB
200 UE
210 radio signal transmission and reception unit
220 amplifier unit
230 modulation and demodulation unit
240 control signal and reference signal processing unit
250 encoding/decoding unit
260 data transmission and reception unit
270 control unit
1001 processor
1002 memory
1003 storage
1004 communication device
1005 input device
1006 output device
1007 bus

The invention claimed is:

1. A terminal comprising:
a transmitter that transmits a transport block using a physical uplink shared channel across a plurality of slots;
a receiver that receives information included in a PUSCH-ConfigCommon information element regarding the transmission of the transport block across the plurality of slots and indicating the number of slots to which the transport block is allocated and a number of repetitions; and a processor that determines the size of the transport block to be transmitted in the plurality of slots based on the information indicating the number of slots,
wherein the processor allocates the same number of symbols to the physical uplink shared channel in each of the plurality of slots, and
wherein the processor controls the transmitter to repeat transmission of the transport block by the physical uplink shared channel across the plurality of slots based on the number of repetitions indicated in the information.

2. A radio communication method for a terminal comprising:
transmitting a transport block using a physical uplink shared channel across a plurality of slots;
receiving information included in a PUSCH-ConfigCommon information element regarding the transmission of the transport block across the plurality of slots and indicating the number of slots to which the transport block is allocated and a number of repetitions;
determining the size of the transport block to be transmitted in the plurality of slots based on the information indicating the number of slots;
allocating the same number of symbols to the physical uplink shared channel in each of the plurality of slots; and
repeating transmission of the transport block by the physical uplink shared channel across the plurality of slots based on the number of repetitions indicated in the information.

3. A base station comprising:
a receiver that receives a transport block from a terminal using a physical uplink shared channel across a plurality of slots;
a transmitter that transmits information included in a PUSCH-ConfigCommon information element regarding the transmission of the transport block across the plurality of slots and indicating the number of slots to which the transport block is allocated and a number of repetitions to the terminal; and
a processor that assumes that the terminal determines the size of the transport block to be transmitted in the plurality of slots based on the information indicating the number of slots and allocates the same number of symbols to the physical uplink shared channel in each of the plurality of slots,
wherein the processor controls the receiver to repeat reception of the transport block by the physical uplink shared channel across the plurality of slots based on the number of repetitions indicated in the information.

4. A radio communication system comprising a terminal and a base station, wherein
the terminal comprises:
a transmitter that transmits a transport block to a base station using a physical uplink shared channel across a plurality of slots;
a receiver that receives information included in a PUSCH-ConfigCommon information element regarding the transmission of the transport block across the plurality of slots and indicating the number of slots to which the transport block is allocated and a number of repetitions from the base station; and
a processor that determines the size of the transport block to be transmitted in the plurality of slots based on the information indicating the number of slots and assigning the same number of symbols to the physi-
cal uplink shared channel in each of the plurality of
slots,
wherein the processor controls the transmitter to repeat
transmission of the transport block by the physical 5
uplink shared channel across the plurality of slots
based on the number of repetitions indicated in the
information, and wherein
the base station comprises:
a receiver that receives the transport block from the 10
terminal using the physical uplink shared channel
across the plurality of slots; and
a transmitter that transmits to the terminal information
indicating the number of slots to which the transport
block is assigned and the number of repetitions. 15

* * * * *